United States Patent [19]

Costas

[11] 4,349,915
[45] Sep. 14, 1982

[54] MINIMIZATION OF MULTIPATH AND DOPPLER EFFECTS IN RADIANT ENERGY COMMUNICATION SYSTEMS

[75] Inventor: John P. Costas, Manlius, N.Y.

[73] Assignee: General Electric Company, Syracuse, N.Y.

[21] Appl. No.: 230,813

[22] Filed: Feb. 2, 1981

[51] Int. Cl.³ ............................................. H04L 1/04
[52] U.S. Cl. ................................... 375/40; 375/100; 455/65; 367/904
[58] Field of Search .................. 375/40, 99, 100, 102, 375/6, 38; 367/904; 455/65, 303, 304, 40

[56] References Cited

U.S. PATENT DOCUMENTS

| | | |
|---|---|---|
| 3,020,399 | 2/1962 | Hollis . |
| 3,116,472 | 12/1963 | Rich . |
| 3,384,822 | 5/1968 | Miyagi ............................ 455/65 X |
| 3,411,089 | 11/1968 | Gicca . |
| 3,523,250 | 8/1970 | Branham . |
| 3,614,721 | 10/1971 | Lagoe . |
| 3,617,889 | 11/1971 | Rabinowitz ...................... 455/65 X |
| 3,638,174 | 1/1972 | Haase et al. . |
| 3,723,956 | 3/1973 | Carman . |
| 3,742,440 | 6/1973 | Ehrlich et al. . |

*Primary Examiner*—Jin F. Ng
*Attorney, Agent, or Firm*—Carl W. Baker; Richard V. Lang

[57] ABSTRACT

Apparatus is disclosed for reproducing transmitted information which is subject to multipath delay spread effects and doppler frequency-shift effects. The information is transmitted as a series of modulated information pulses of differing nominal frequencies. The nominal frequencies of successive pulses are repeatedly shifted through a predetermined sequence of frequencies. Arrivals of the transmitted pulses are detected at a receiver and are processed to determine the frequencies to which the transmitted pulses are doppler shifted and the multipath delays of each pulse. This frequency and delay information is then used to reproduce the transmitted information from the arrival pulses.

3 Claims, 46 Drawing Figures

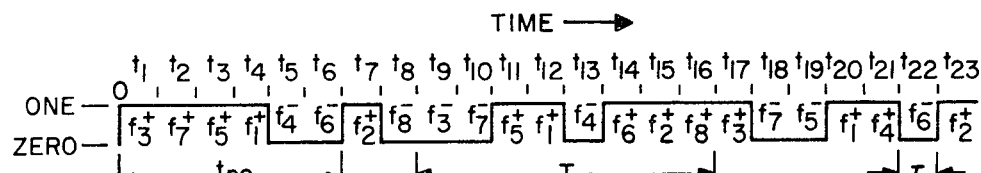
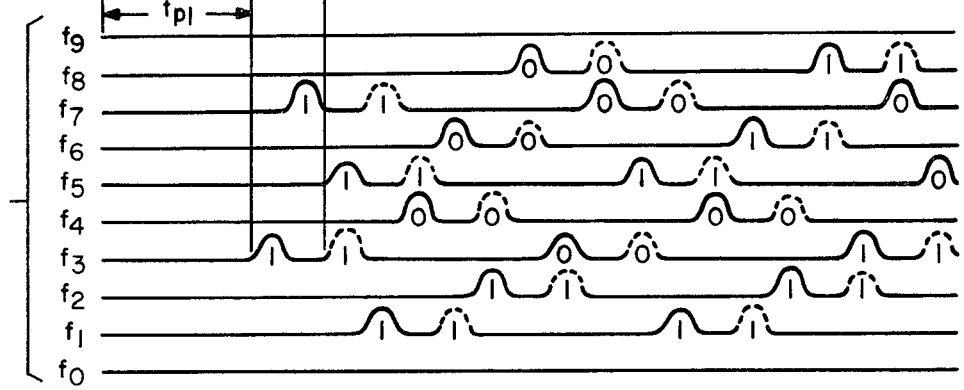
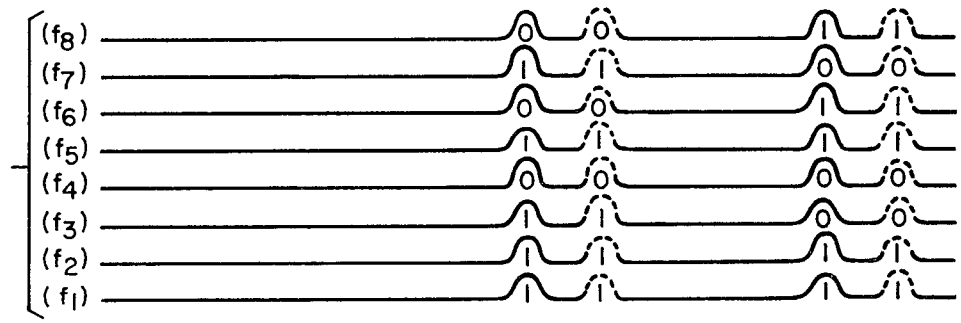
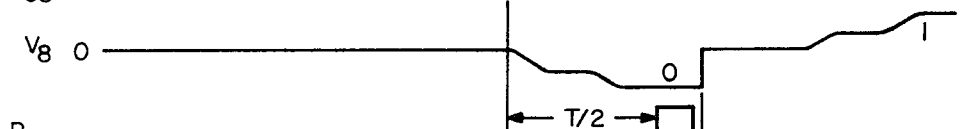
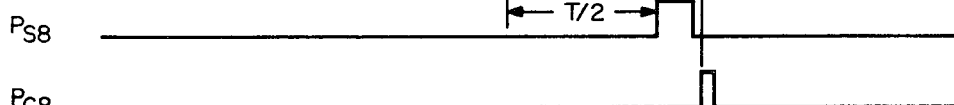
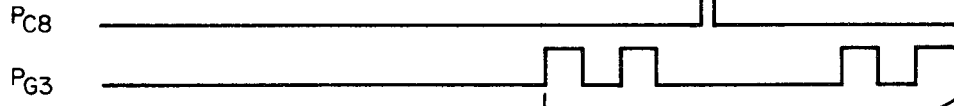
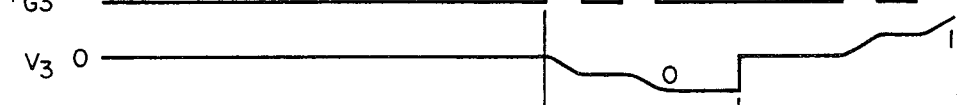
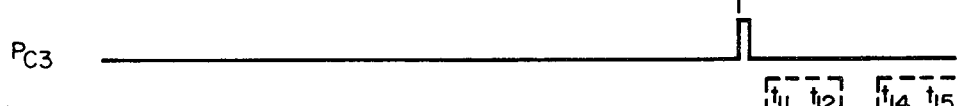
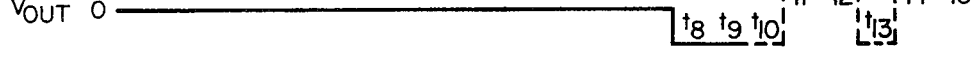

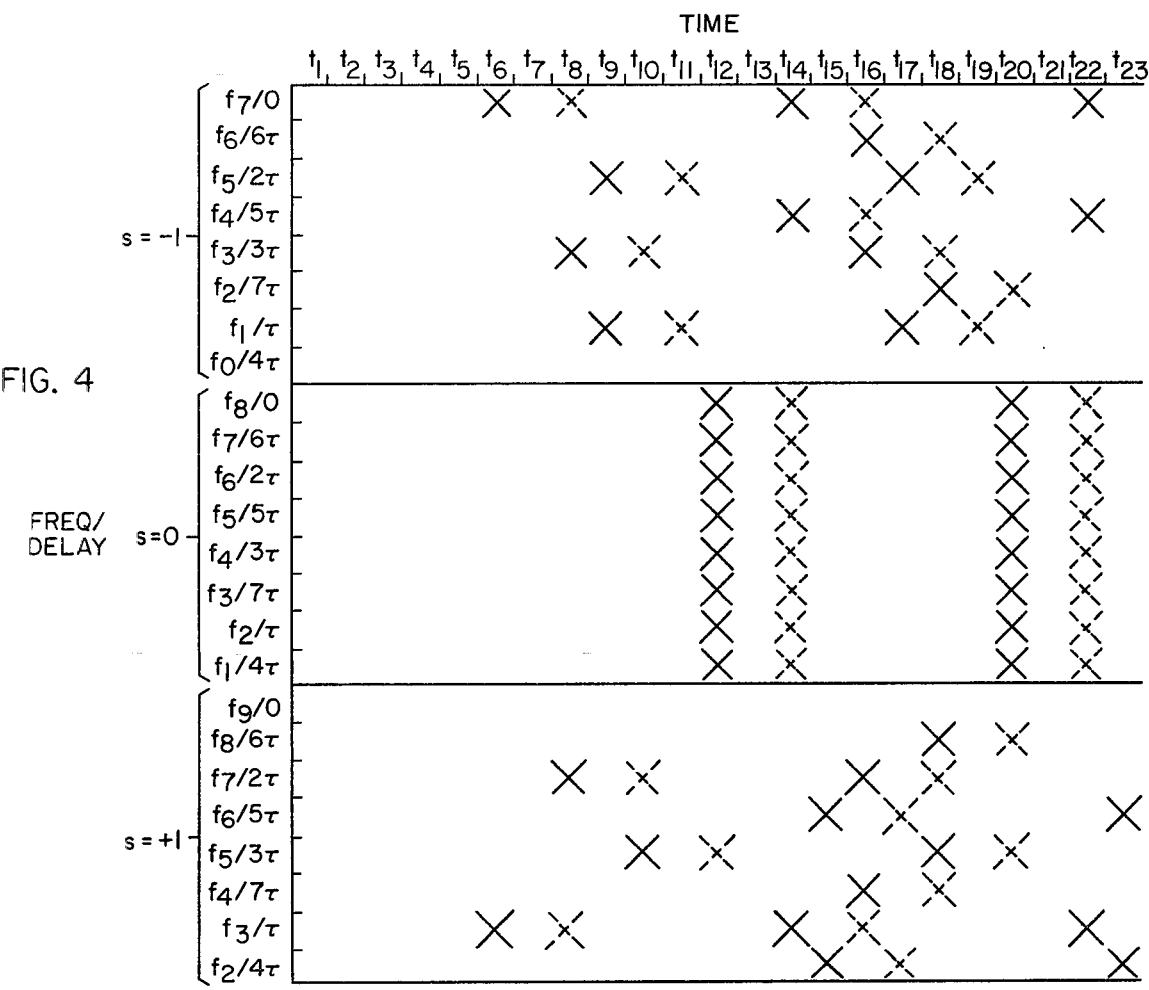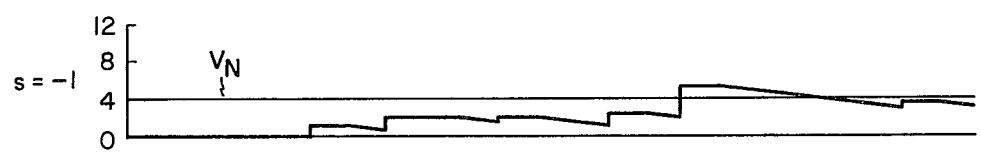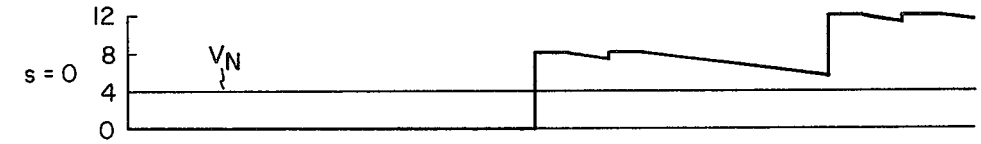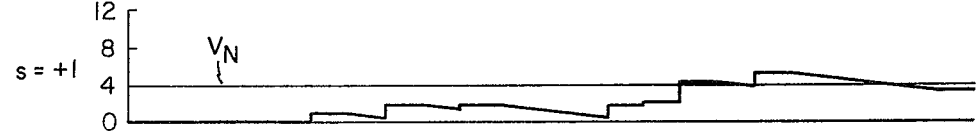

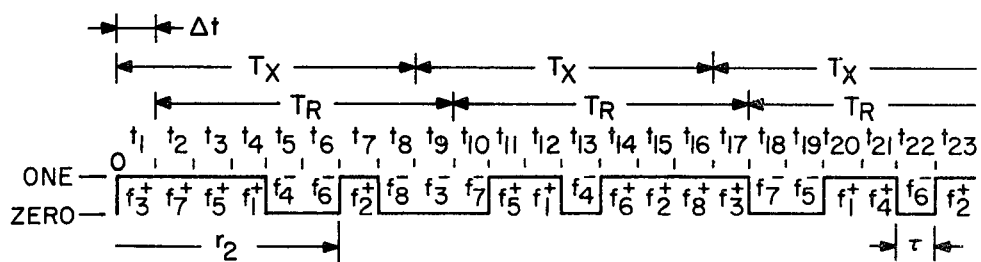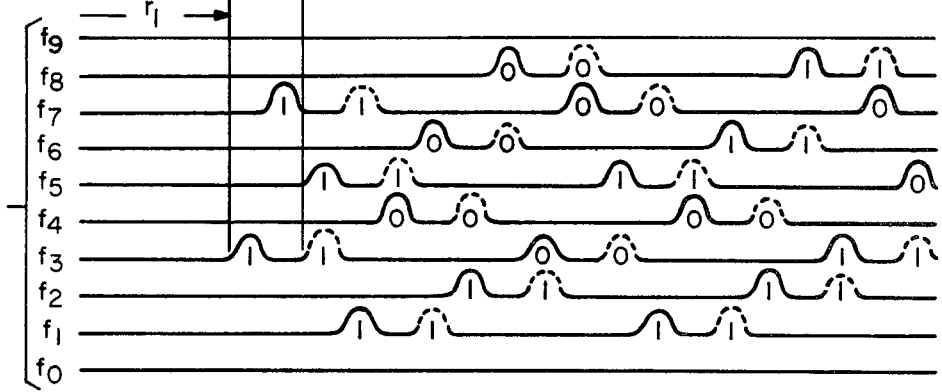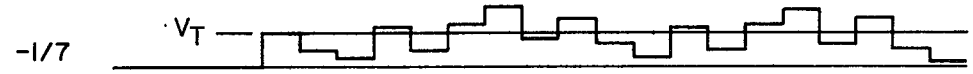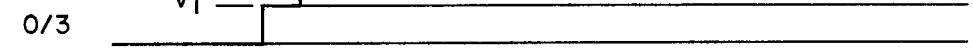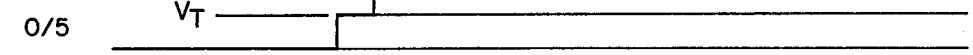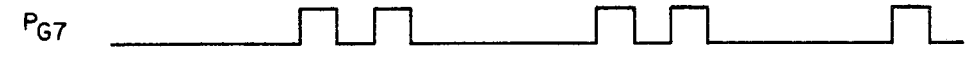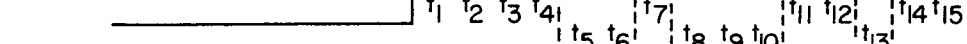

MINIMIZATION OF MULTIPATH AND DOPPLER EFFECTS IN RADIANT ENERGY COMMUNICATION SYSTEMS

BACKGROUND OF THE INVENTION

1. Field of the Invention

This invention relates to radiant energy communications and particularly to such communications through mediums where radiated energy is subject to multipath delay spread effects and doppler frequency-shift effects.

2. Description of the Prior Art

In radiant energy communications systems, transmitters and receivers are often linked by a multiplicity of energy propagation paths. For example, if electromagnetic energy is transmitted through the atmosphere to communicate information, a first portion of the energy might be reflected at the surface of a first ionospheric layer and then travel directly to the receiver. A second portion of this energy might pass through the first layer and be reflected at the surface of a second, higher layer and then continue on to the receiver. Other paths of propagation are also possible, including paths followed by energy subjected to multiple reflections between the upper and lower surfaces of a single layer.

Another example of radiant energy communications susceptible to multipath propagation is that of acoustic energy transmitted through water. In this medium, the reflective surfaces include the water surface, the bottom, and the boundaries between water layers of differing temperatures.

As a consequence of such multipath propagation, a multiplicity of arrivals of energy are received for each piece of information transmitted. Because the multiple arrivals for each piece of information become interspersed with each other, it is difficult to discriminate between a first arrival of new information and a later arrival of information already received.

Discrimination between multipath arrivals representing individual pieces of information is further complicated if either the transmitter or the receiver is in motion relative to the medium of propagation. Such motion causes continuous changes in the paths of propagation between the transmitter and the receiver and these changes can affect both the number of arrivals and the sequence in which they are received. These variations are particularly evident in underwater communications because of the often radical variations of the bottom.

One technique suggested by the prior art for discriminating between multiple arrivals is that of transmitting energy in the form of a series of modulated pulses representing the information, the nominal frequencies of successive pulses being repeatedly shifted through a predetermined sequence of frequencies. This technique should enable discrimination between arrival pulses received at the receiver because multiple arrivals of each transmitted pulse will be received at the same distinct frequency. In practice, however, prior art attempts to reproduce the transmitted information from received arrivals have met with only limited success. This lack of success stems largely from a failure to discriminate between noise energy and energy originating from transmitted pulses.

One prior art adaptation of the frequency shifting technique attempts to discriminate against noise by utilizing the first arrival pulse received at each of the transmitted frequencies as the arrival pulse representative of the piece of information transmitted at that frequency. This adaptation is based on the premise that the first arrival pulse has a greater magnitude than later arrival pulses, because it travelled the shortest path, and has a greater magnitude than noise energy received. This is not realistic, however, because of magnitudes of the individual arrival pulses originating from each transmitted pulse depend not only on the distance of the path travelled but also on the reflectivity and absorptivity characteristics of the path. Nor does any particular path consistently produce the arrivals of greatest magnitude, because path characteristics continually change. These changes result both from gradual physical changes in the layers of the medium of propagation and also from motion of the transmitter or receiver relative to the medium. Thus, utilization of the first arrivals to discriminate againt noise is effective.

Another reason for the limited success of prior art adaptations of the frequency shifting technique is the failure of such adaptations to adequately compensate for doppler shifts of the transmitter frequencies when there is relative motion between the transmitter and the receiver. Broadening of receiver bandwidth to accommodate positive and negative doppler shifts of the transmitted frequencies is unacceptable because it increases receiver sensitivity to noise.

SUMMARY OF THE INVENTION

It is an object of the present invention to accurately reproduce information transmitted by the above described frequency shifting technique.

It is another object to accurately reproduce the information despite variations of the propagation characteristics of the paths through which the information-bearing energy travels, and despite motion of the transmitter and receiver relative to the medium of propagation.

It is a further object to accurately reproduce the information despite doppler shifts of the transmitted frequencies.

These and other objects of the invention are accomplished by continuously determining both the doppler-shifted frequencies at which the arrival pulses are received and the propagation delays of the paths travelled by the arrival pulses. This information is then used to detect and accumulate all arrival pulses originating from each transmitted pulse.

The doppler-shifted frequencies at which the arrival pulses are received are determined by detecting and comparing energy received at distinct frequencies, the range of frequencies detected being broad enough to include all doppler-shifted frequencies which will be received at predetermined doppler shifts occurring over an expected range of relative velocities of the transmitter and receiver. The propagation delays are determined by producing a pulse coexistent with the reception of each arrival pulse detected at a predetermined one of the doppler-shifted frequencies received. These coexistent pulses define a time pattern descriptive of the multipath propagation delays.

The time pattern is used to effect production of a series of gating pulses for each of the doppler-shifted frequencies at which arrival pulses are received. The gating pulses produced for each of these frequencies occur simultaneously with the reception of arrival pulses at the frequency and are utilized to gate into an individual accumulator the simultaneously-received arrival pulses. No accumulation takes place in the interims between gating pulses and thus noise energy received during the interims between successive arrival pulses is effectively discriminated against.

The accumulation in each accumulator is sampled after all arrival pulses originating from a common transmitted pulse have been accumulated thereby. Each of these samples represents a different piece of the transmitted information.

BRIEF DESCRIPTION OF THE DRAWING

FIGS. 2A-2M are waveform diagrams of typical signals produced during operation of the first embodiment.

FIG. 4 is a diagram illustrating the times at which signals are produced by delay units illustrated in FIG. 1.

FIG. 6 is a diagram illustrating the magnitudes of summations produced at specific times by analog summers illustrated in FIG. 1.

FIGS. 7A-7C are waveform diagrams of typical signals produced by peak detectors illustrated in FIG. 1.

FIGS. 11A-11P are waveform diagrams of typical signals produced during operation of the second embodiment.

DESCRIPTION OF THE PREFERRED EMBODIMENTS

One type of communication for which the present invention is particularly well suited is that of communicating digital or telegraphic information by transmitting a series of pulses, each pulse representing a particular digital or telegraphic state. Two embodiments of the invention, each adapted for use in reproducing digital information, are described.

First Embodiment

Figure 1:
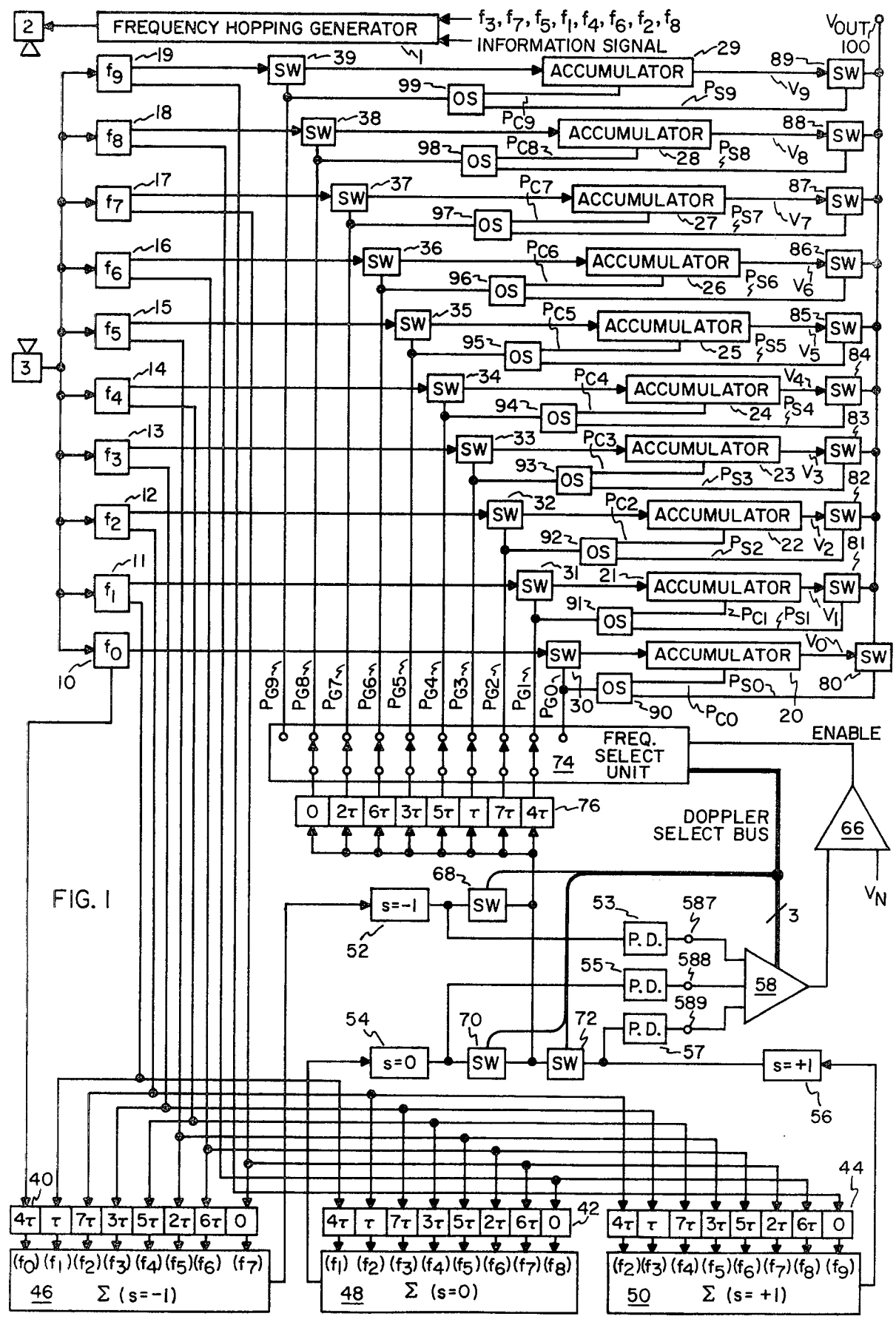
FIG. 1 is a schematic diagram of a first embodiment of the invention.

In the first embodiment, illustrated in FIG. 1, a frequency hopping generator 1 produces a series of modulated information pulses of differing nominal frequencies which are representative of the information to be transmitted. This generator is not shown in detail, but is similar to prior art equipment used for transmitting such pulses. Typically the generator comprises a mixer for producing the pulses and an amplifier for increasing the power level thereof sufficiently to drive a transmitter 2. The mixer receives at a first input a predetermined sequence of eight frequencies designated $f_1-f_8$, which is periodically repeated, and receives at a second input an information signal which shifts between two frequencies representative of a logical ONE and a logical ZERO. Each of the eight frequencies is received for a duration $\tau$ as is each logical ONE and logical ZERO bit represented by the information signal, and these bits are synchronized with the eight frequencies. Each information pulse produced by the mixer has a nominal frequency corresponding to one of the eight frequencies $f_1-f_8$. The pulses are modulated by the information signal such that each logical ONE bit causes an incremental increase above the nominal frequency, and each logical ZERO bit causes an incremental decrease below the nominal frequency. The amount of increase or decrease must be less than $\frac{1}{4}$ of the difference between the closest nominal frequencies to prevent overlap of the modulated frequencies.

A sample information signal waveform and the corresponding frequencies of the information pulses are illustrated in FIG. 2A where the symbols $t_1, t_2, \ldots t_{23}$ indicate the time intervals during which each information pulse is produced. The modulated frequency produced during each time interval is indicated by the respective nominal frequency symbol and either a (+) or a (−) superscript. The (+) superscript indicates that the nominal frequency produced during the time interval has been increased to represent a logical ONE and the (−) superscript indicates that the nominal frequency produced during the time interval has been decreased to represent a logical ZERO. The letter T in FIG. 2A represents the period of any time frame during which the eight different nominal frequencies are applied to the mixer. The time frame indicated in FIG. 2A includes the time intervals $t_9-t_{16}$.

The information pulses are applied to the transmitter 2 which converts them to radiated energy and transmits them through a medium of propagation to a receiver 3. Any transmitter and receiver capable of communicating through the particular medium of interest are suitable. For example, acoustic transducers could be used for communicating through water.

For each information pulse transmitted by transmitter 2 more than one arrival pulse is usually received by receiver 3 because of the previously described multipath delay spread effects. If the transmitter and receiver are stationary with respect to each other, no doppler frequency shift occurs and each arrival pulse will have the same frequency as the information pulse from which it originated. If relative motion between the transmitter and receiver is experienced, however, doppler shifts of the transmitted frequencies will be encountered and provision must be made for detecting at the receiver a range of frequencies broad enough to include the doppler-shifted frequencies. The specific range of frequencies involved is determined from knowledge of the possible range of relative velocities of the transmitter and the receiver. From this knowledge, a set of possible relative velocities is chosen and provision is made for detecting all frequencies to which the transmitted information pulses will be doppler-shifted at each of these velocities. For purposes of simplifying the description of the invention, a set of three velocities $-v_1, 0, +v_1$ has been chosen, but in practice a larger number of velocities will ordinarily be involved. To further simplify the description, only ten frequencies designated $f_0-f_9$ will be detected to cover the range of doppler-shifted frequencies for the three possible relative velocities, with the frequencies $f_0-f_7$ representing the set of down doppler-shifted frequencies received at the velocity $-v_1$, and the frequencies $f_2-f_9$ representing the set of up doppler-shifted frequencies received at the velocity $+v_1$.

A plurality of detection units desigated 10-19 are connected to receiver 3 for detecting the arrival pulse frequencies $f_0-f_9$, respectively. Each of these detection units produces two pulses simultaneously with the detection of each arrival pulse—a demodulated arrival pulse and a detected arrival pulse. The demodulated arrival pulse has a positive or negative polarity, representing the logical ONE or logical ZERO, respectively, communicated by the arrival pulse and has a magnitude representing the magnitude of the arrival pulse. The detected arrival pulse is a positive polarity replica of the arrival pulse, representing the magnitude thereof.

Figure 3:
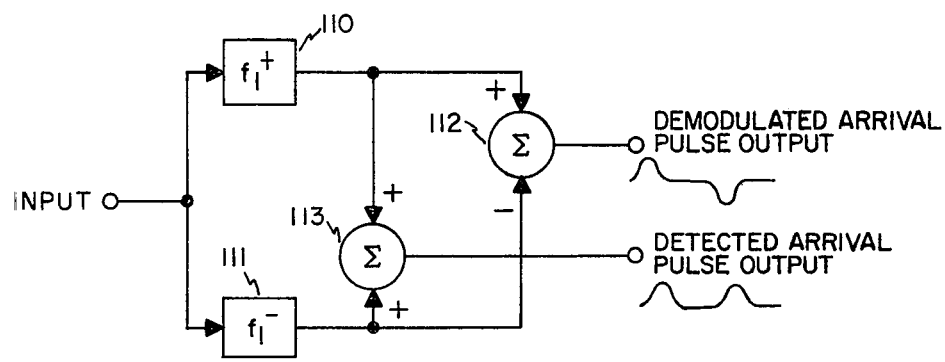
FIG. 3 is a detailed schematic diagram of a detection unit illustrated generally in FIGS. 1 and 10.

Detection unit 11, which detects arrival pulses of frequency $f_1$, is illustrated in detail in FIG. 3 as comprising two detectors 110 and 111 for detecting the frequencies $f_1{}^+$ and $f_1{}^-$, respectively, and two analog summers 112 and 113 for producing the demodulated arrival pulses and the detected arrival pulses, respectively. Whenever detection unit 11 receives an arrival pulse of frequency $f_1{}^+$, detector 110 produces a positive replica thereof which is applied to positive inputs of summers 112 and 113 causing production of a positive demodulated arrival pulse and a positive detected arrival pulse. Whenever detection unit 11 receives an arrival pulse of frequency $f_1{}^-$, detector 111 produces a positive replica thereof which is applied to a negative input of summer 112 and a positive input of summer 113 causing production of a negative demodulated arrival pulse and a positive detected arrival pulse. All of the detection units are configured identically to that shown in FIG. 3, with each unit being adapted for operation at the frequency designated in FIG. 1.

The demodulated arrival pulses are applied to a plurality of accumulators 20-29 (see FIG. 1) through a plurality of switches 30-39 under the control of periodically produced gating pulses $P_{G0}-P_{G9}$ which effect closing of the switches. (Production of these pulses is described in subsequent paragraphs.) Gating pulses are produced for only the switches connected to the detection units adapted to detect the frequencies to which the transmitted frequencies are shifted at the actual relative velocity of the transmitter and the receiver. Additionally, the gating pulses applied to each switch are produced only when valid arrival pulses are being received by the detection unit connected thereto and not when noise energy is detected by the unit. The switches to which the gating pulses are applied and the timing of these pulses are determined by processing the detected arrival pulses.

To understand the basis for making these determinations refer to FIG. 2B where the waveforms of typical arrival pulses, originating from the information pulses illustrated in FIG. 2A, are received at a receiver 3 which has zero relative velocity with respect to the transmitter 2. The waveforms are ideal representations from which all noise energy has been eliminated to clearly show the repetitious nature of the arrival pulses at each of the frequencies detected. Note that in this ideal representation each solid line arrival pulse is followed by a dotted line arrival pulse. These represent groups of first and second arrival pulses, respectively, for each information pulse transmitted through a medium where two paths of propagation with propagation times $t_{p1}$ and $t_{p2}$ are currently in existence. The arrival pulses follow a definite pattern with respect to the number of pulses in a group and the time separations between the pulses. If the arrival pulses detected are isolated from noise energy detected, and the pattern of the arrival pulses is recognized, both the set of frequencies at which the arrival pulses are received and the times of detection of the arrival pulses at each of these frequencies can be precisely determined. Such isolation and pattern recognition can be accomplished by making use of the random nature of noise energy detected, the repetitious nature of arrival pulses detected at each frequency, and knowledge of the sequence of frequencies at which the information pulses are transmitted.

Each information pulse frequency in any selected time frame is transmitted a known number of time intervals (each of duration $\tau$) before the last frequency in the frame. Consequently, for the set of arrival pulse frequencies at which the information pulses transmitted during this time frame are received, and for each of the existing propagation paths, an arrival pulse of each frequency will be received a known number of time intervals $\tau$ before the arrival pulse at the frequency at which the last pulse transmitted in the time frame is received. Therefore, if the arrival pulses received at each frequency are delayed by the number of intervals $\tau$ by which they precede the arrival pulses received at the last frequency in the set, all arrival pulses received from the same path and originating from the information pulses transmitted during the time frame will be time-aligned.

The existence of each of the three possible doppler shifts, occurring at the velocities $-v_1$, 0, $+v_1$ can be tested for by delaying (in the above-described manner) the detected arrival pulses received at each of the sets of frequencies $f_0-f_7$, $f_1-f_8$, $f_2-f_9$, respectively. Only the arrival pulses received at the set of doppler-shifted frequencies corresponding to the existing relative velocity of the transmitter and receiver will be time-aligned. Such time alignment indicates the existing relative velocity and the pattern of time-aligned pulses represents the propagation delays at which the arrival pulses are received.

FIG. 4 illustrates the effect of delaying the arrival pulses depicted in FIG. 2B to test for the three possible doppler shifts. Hereinafter these doppler shifts shall be referred to as $s=-1, 0, +1$ corresponding to the doppler shifts occurring at the relative velocities $-v_1$, 0, $+v_1$, respectively. The specific delays utilized for arrival pulses received at the frequencies in each set are indicated in FIG. 4. The delays are chosen to effect the alignment of detected arrival pulses originating from information pulses transmitted during time frames ending with the frequency $f_8$. (The selection of time frames ending with this particular frequency is arbitrary.) For example, in the $s=0$ set, arrival pulses of frequency $f_5$ are delayed by $5\tau$, because at zero relative velocity the received frequency $f_5$ is also transmitted as frequency $f_5$, five time intervals ($5\tau$) before the last frequency ($f_8$) in the selected time frame. However, in the $s=-1$ set, arrival pulses of frequency $f_5$ are delayed by $2\tau$, because at the negative relative velocity $-v_1$ the received frequency $f_5$ is transmitted as frequency $f_6$, two time intervals ($2\tau$) before $f_8$. Furthermore, in the $s=+1$, set, arrival pulses of frequency $f_5$ are delayed by $3\tau$, because at the positive relative velocity $+v_1$ the received frequency $f_5$ is transmitted as frequency $f_4$, three time intervals ($3\tau$) before $f_8$.

The X's in FIG. 4 indicate the times of occurrence of three sets of delayed arrival pulses derived from the arrival pulses depicted in FIG. 2B. The solid-line X's represent the delayed arrival pulses derived from first arrivals of the transmitted information pulses and the dashed-line X's represent the delayed arrival pulses derived from second arrivals. The time of occurrence of each of the delayed arrival pulses is indicated at the top of FIG. 4 by time designations which are identical to those at the top of FIG. 2A. Note that for the set of received frequencies corresponding to the doppler shift $s=0$ all of the delayed arrival pulses derived from information pulses transmitted during the same time frame and following the same path become time-aligned, while the delayed arrival pulses produced at the other two sets of frequencies do not become time-aligned. For example, the delayed arrival pulses originating from the information pulses transmitted during the time frame $t_1$–$t_8$ and following the path having the propagation time $t_{P1}$ become time-aligned at time $t_{12}$. Correspondingly, the delayed arrival pulses originating from these same information pulses, but following the path having the propagation time $t_{P2}$ become time-aligned at time $t_{14}$.

Delay units, each comprising a plurality of delay elements for effecting the different delays for each of the three sets of doppler-shifted frequencies are illustrated at 40, 42, and 44 in FIG. 1. In order to determine which of these delay units is producing time-aligned pulses, three analog summers 46, 48, 50; three recursive filters 52, 54, 56; three peak detectors 53, 55, 57; and a comparator 58 are provided. The delay elements in each delay unit are connected to the detected arrival pulse outputs of the detection units adapted to detect arrival pulses received at the set of frequencies corresponding to a respective one of the doppler shifts.

Each analog summer (46, 48, 50) continuously sums the magnitudes of delayed pulses produced by a respective one of the delay units and produces composite pulses representing these sums. The summer receiving the time-aligned pulses produces composite pulses of greater magnitude than those produced by the other summers, because of the dispersed time distribution (see FIG. 4) of the delayed pulses received by those summers.

The recursive filters, the peak detectors and the comparator are utilized to determine which summer is consistently producing the composite pulses of greatest magnitude. The recursive filters provide enhanced composite pulses having magnitudes which are time-weighted averages of the composite pulse magnitudes, thus minimizing the effects of unusually low magnitude composite pulses produced by the summer testing for the existing doppler shift and of unusually high magnitude composite pulses produced by the other summers.

Figure 5:
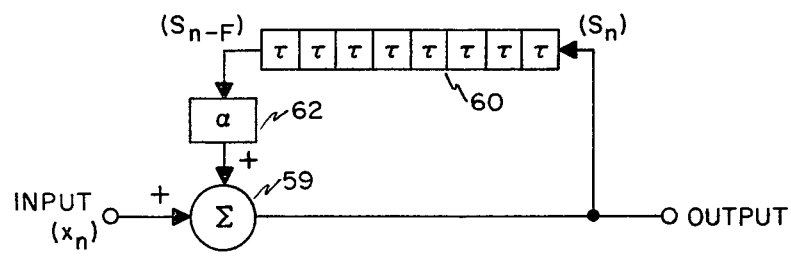
FIG. 5 is a detailed schematic diagram of a recursive filter illustrated generally in FIG. 1.

A typical recursive filter which can be used is illustrated in detail in FIG. 5 as comprising an input for receiving the composite pulses, an analog summer 59, a delay unit 60, an attenuator 62, and an output. During each time interval $t_n$, summer 59 produces an analog sum $S_n$ having a magnitude determined by the equation:

$$S_n = x_n + \alpha S_{n-F}$$

where:

$x_n$ = the magnitude of the composite pulse applied to the input during time interval $t_n$ $\alpha$ = attenuation factor $S_{n-F}$ = magnitude of the sum produced by summer 59 during the time interval $t_{n-F}$ $F$ = the number of time intervals ($\tau$) in a time frame The summer 59 produces the sums $S_n$ and provides them as the enhanced composite pulses at the output of the recursive filter. This is effected by summing the magnitudes of the composite pulses $X_n$ received at the input of the recursive filter with reduced magnitude versions $\alpha S_{n-F}$ of sums previously produced by the summer. The previously produced sums are provided by the delay unit 60, comprising F serially-connected delay elements, each element providing a delay of $\tau$. The delay unit 60 receives all sums produced by summer 59 and shifts them through the eight delay elements therein. The sum $S_{n-F}$ is provided at an output of the delay unit simultaneously with receipt of the composite pulse $x_n$ by the summer 59. The sum $S_{n-F}$ is reduced in magnitude by the attenuator 62 to produce the reduced magnitude sum $\alpha S_{n-F}$, which is summed with the magnitude of composite pulse $x_n$ at time $t_n$ by the summer 59.

Each of the eight sums effectively stored in delay unit 60 is a weighted average of the magnitudes of the composite pulses produced by one of the three summers 46, 48, 50 during a particular one of the eight time intervals occurring in each time frame. It is a time-weighted average, because the most recent magnitude $X_n$ is given its full weight during summation while previous magnitudes have been attenuated once for each time frame period that has elapsed since they were first applied to the recursive filter. If composite pulses are consistently produced furing the $m^{th}$ interval in each time frame, the $m^{th}$ sum produced by summer 59 during each time frame will be consistently reinforced by the reduced magnitude version of the sum produced during the $m^{th}$ interval of the previous time frame. The summer in the recursive filter receiving the composite pulses derived from the set of arrival pulse frequencies actually received will produce the sums of greatest magnitude, as can be seen from FIG. 6 which lists the relative magnitudes of the sums produced by the three recursive filters 52, 54, 56 during time intervals $t_1$–$t_{23}$ for the time-delayed arrival pulses occurring at the times illustrated in FIG. 4. For the purpose of computing these relative magnitudes each arrival pulse is assumed to have unity magnitude.

The enchanced composite pulses produced by each of the recursive filters 52, 54, 56 are applied to a respective one of the three peak-detectors 53, 55, 57. These peak detectors are conventional devices which produce peak signals having magnitudes which change instantaneously to follow increases in magnitude of applied signals, but which change slowly, relative to the period T, to follow decreases in magnitude. Peak signals produced at the outputs of the peak detectors 53, 55, 57 in response to the enhanced composite pulses applied thereto are shown in FIGS. 7A, 7B, 7C, respectively. These three peak signals are applied to input terminals of the comparator 58 designated 587, 588, 589, respectively.

The comparator 58 continuously determines which of the analog summers 46, 48, 50 is producing the composite pulses of greatest magnitude by comparing the three peak signals derived from the composite pulses. The doppler shift tested for by this summer is the existing doppler shift. The composite pulses themselves occur at times which represent the propagation delays at which the arrival pulses are received.

Figure 8:
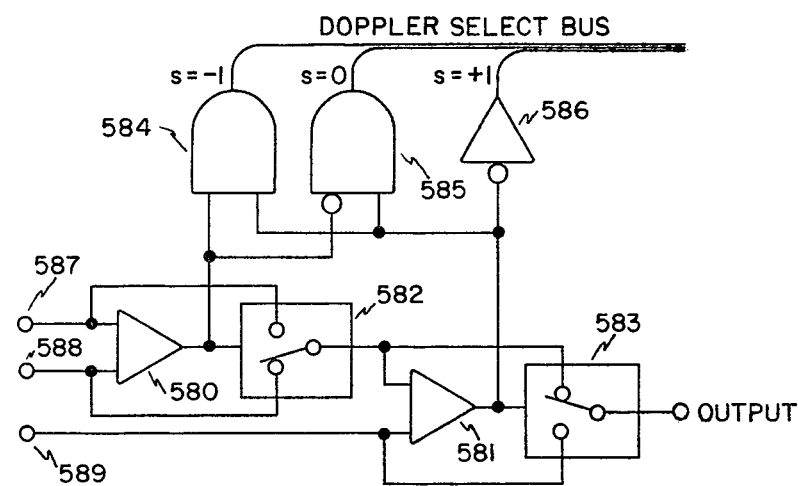
FIG. 8 is a detailed schematic diagram of a comparator illustrated generally in FIG. 1.

Comparator 58 is illustrated in one form thereof in FIG. 8 as comprising dual input operational amplifiers 580, 581; analog switches 582, 583; and logical elements 584, 585, 586. The amplifiers are connected for open loop operation and are each powered by positive and negative supply voltages representative of logical ONE and logical ZERO voltage levels, respectively.

The two inputs of amplifier 580 are connected to the input terminals 587, 588, respectively. Because the amplifier is connected for open loop operation, it saturates in one direction and produces a logical ONE output when the peak signal applied to terminal 587 is of greater magnitude than that applied to terminal 588, indicating that the largest magnitude enhanced composite pulses produced by recursive filter 52 are consistently greater than those produced by recursive filter 54. The amplifier saturates in the opposite direction and produces a logical ZERO output when the peak signal applied to terminal 588 is of greater magnitude than that applied to terminal 587 indicating the opposite condition.

The output signal produced by amplifier 580 controls analog switch 582 such that the switch connects the input terminal (587 or 588) receiving the peak signal of greater magnitude to one input of amplifier 581. The other input of amplifier 581 is permanently connected to input terminal 589.

Amplifier 581 operates in the same manner as amplifier 580 and determines whether the peak signal it receives from switch 582 or that received from input terminal 589 is of greater magnitude. The logical output signal produced by amplifier 581 controls switch 583 to effect connection of the peak signal of greatest magnitude applied to the three input terminals 587, 588, 589 to the output terminal of the comparator 58.

The peak signal provided at the output of comparator 58 is applied to one input of a comparator 66 (see FIG. 1) which is a conventional dual input comparator. The comparator 66 receives at its other input, a threshold voltage $V_N$ having a magnitude equal to the minimum magnitude peak signal which will be produced when a communication is being received by receiver 3. The comparator 66 produces an ENABLE signal whenever the magnitude of the peak signal received from comparator 58 is greater than the magnitude of the threshold voltage $V_N$.

The logic elements 584, 585, 586 in comparator 58 are utilized to produce logical signals which effect selection of the recursive filter 52, 54 or 56 producing the enhanced composite pulses of greatest magnitude. The output of each of these elements is connected to one of three signal lines in a doppler select bus which connects the comparator 58 to three switches 68, 70, 72 which receive the composite pulses produced by the filters 52, 54, 56, respectively, and to a frequency select unit 74. This unit is a solid state, 8 pole 3 position switch utilized to select the switches 30–39 which will receive the aforementioned gating pulses.

Logic element 584 is an AND-gate with two non-inverting inputs which monitors the logical output signals produced by amplifiers 580 and 581 and produces an $s \times -1$ doppler-select signal whenever the peak signal of greatest magnitude is received at input terminal 487, causing both of the amplifiers to produce logical ONE output signals. The $s \times -1$ doppler-select signal is transmitted over a first one of the three signal lines in the bus to effect closing of switch 68, and to frequency-select unit 74 to effect selection of switches 30–37 for reception of the gating pulses $P_{G0}-P_{G7}$.

Logic element 585 is an AND-gate having one inverting and one non-inverting input. This gate monitors the logical output signals produced by amplifiers 580 and 581 and produces an $s=0$ doppler-select signal whenever the peak signal of greatest magnitude is received at input terminal 588, causing amplifier 580 to produce a logical ZERO signal and amplifier 581 to produce a logical ONE signal. The $s=0$ doppler-select signal is transmitted over a second one of the three signal lines in the bus to effect closing of switch 70, and to frequency-select unit 74 to effect selection of switches 31–38 for reception of the gating pulses $P_{G1}-P_{G8}$.

Logic element 586 is an inverter which monitors the logical output signal produced by amplifier 581 and produces an $s = +1$ doppler-select signal whenever the peak signal of greatest magnitude is received at input terminal 589 causing amplifier 581 to produce a logical ZERO. The $s = +1$ doppler-select signal is transmitted over a third one of the three signal lines in the bus to effect closing of switch 72, and to frequency-select unit 74 to effect selection of switches 32–39 for reception of the gating pulses $P_{G2}-P_{G9}$.

The doppler-select signal being produced at any time is the one which represents the doppler shift existing at that time. This signal closes the switch 68, 70 or 72 receiving the enhanced composite pulses produced by the summer 46, 48 or 50 testing for such doppler shift. Those pulses are enhanced by the recursive filter 52, 54 or 56 connected to the summer producing them and then pass through the closed switch and are processed to form the gating pulses.

The enhanced composite pulses passed by the closed switch 68, 70 or 72 occur simultaneously with the detection of arrival pulses received at the frequency to which frequency $f_8$ is doppler shifted. Thus, gating pulses produced simultaneously with these enhanced composite pulses would be effective in closing the switch connected to the detection unit adapted to detect the frequency to which $f_8$ is doppler-shifted at the precise times when arrival pulses are received at this detection unit. By producing eight replicas of each of these composite pulses, at delays of 0, $\tau$, $2\tau$, ... $7\tau$, replica pulses occurring simultaneously with the detection of arrival pulses at all eight of the received frequencies will be produced. As illustrated in FIG. 1, these delays are provided by a delay unit 76 comprising eight delay elements to which the composite pulses passed by the closed switch 68, 70 or 72 are applied.

The manner in which the gating pulses are produced can be best understood by referring to FIGS. 2A–2D and 7A–7C. By comparing the peak signals illustrated in FIGS. 7A–7C it can be seen that the peak signals representing the doppler shifts $s= -1$, $s= +1$ are of greater magnitude than the peak signal representing the actually existing zero doppler shift ($s=0$), during time intervals $t_6-t_{11}$, because the first eight arrival pulses utilized by summer 48 to form its composite pulse are delayed until time $t_{12}$ where they align. Thus, comparator 58 might initially select $s=-1$ or $s=+1$ as the existing doppler shift even though there is zero relative velocity between the transmitter and the receiver. However, the magnitude of these peak signals representing the incorrect doppler shifts are smaller than the threshold voltage $V_N$, prior to time $t_{12}$, and are small compared to that which will be produced from the s=0 composite pulses applied to peak detector 55 after time $t_{11}$. Therefore, no ENABLE signal will be produced during time intervals $t_6$–$t_{11}$ an no replicas of the composite pulses produced by summers 46 or 50 will be allowed to pass through the frequency select unit 74.

During time interval $t_{12}$ peak detector 55 produces a peak signal resulting from the first time alignment of all eight delayed arrival pulses, and the magnitude of this peak signal exceeds that of the other two peak signals and that of the threshold voltage $V_N$. The peak signal produced by peak detector 55 will continue to be the one of greatest magnitude as long as the relative velocity of the transmitter and the receiver remains unchanged, and comparator 58 will transmit an s=0 doppler select signal to switch 70 beginning at time interval $t_{12}$. This signal closes the switch allowing all of the enhanced composite pulses produced by recursive filter 54 to pass to the delay unit 76. These composite pulses, which are illustrated in FIG. 2D, will be routed through the delay unit and emerge from the frequency select unit as the gating pulses. Because the frequency select unit receives an s=0 doppler select signal from comparator 58, beginning at time interval $t_{12}$, it thereafter selects switches 31–38 for application of the gating pulses.

The zero-delayed replicas produced by the zero delay element pass through the frequency select unit and emerge as the gating pulses $P_{G8}$ which are applied to switch 38. These gating pulses occur simultaneously with the reception of the arrival pulses detected at frequency $f_8$ by detection unit 18, to which switch 38 is connected. The simultaneous occurrences of the $P_{G8}$ gating pulses and the arrival pulses detected at frequency $f_8$ can be verified by comparing FIGS. 2B and 2E where the arrival pulses and the $P_{G8}$ gating pulses are illustrated.

Note that the gating pulses illustrated in FIG. 2E are clipped versions of the composite pulses illustrated in FIG. 2D. Such clipping is performed by solid state circuitry in the frequency select unit to limit the magnitude of the gating pulses below a maximum level that may be applied to the gating inputs of the switches 30–39.

FIG. 2I illustrates the $P_{G3}$ gating pulses produced from the $\tau$-delayed composite pulse replicas applied to the frequency select unit by the delay unit 76. By comparison of FIGS. 2I and 2B it can be seen that for every arrival pulse detected at frequency $f_3$, subsequent to the detection of such arrival pulses at times $t_5$ and $t_7$, a $P_{G3}$ gating pulse is simultaneously produced.

No $P_{G3}$ gating pulses are produced during the time intervals $t_5$ and $t_7$ because the detected arrival pulses produced during those times by detection unit 13 are delayed by $7\tau$ to contribute to the construction of the composite pulses produced by summer 48 at times $t_{12}$ and $t_{14}$ and these composite pulses were delayed by $1\tau$ to produce the $P_{G3}$ gating pulses exactly one time frame period T after the first two arrival pulses at frequency $f_3$ were detected. Thus the first two demodulated arrival pulses produced by detection unit 13 are not allowed to pass through switch 33, and the $f_3$ information pulse transmitted at time $t_1$ (which was detected as the $f_3$ arrival pulses at times $t_5$ and $t_7$) is lost.

The remaining six delay elements in delay unit 76 delay the composite pulses from summer 48 by the times $2\tau$, $3\tau$, $4\tau$, $5\tau$, $6\tau$, $7\tau$, to effect production of the gating pulses $P_{G7}$, $P_{G5}$, $P_{G1}$, $P_{G4}$, $P_{G6}$, $P_{G2}$, respectively. These gating pulses are produced simultaneously with the detection of arrival pulses at the frequencies corresponding to the subscripts of the gating pulses, subsequent to time $t_{13}$. None of these gating pulses are produced during times $t_6$–$t_{13}$, because of the delays imposed on the detected arrival pulses received at the frequencies $f_7$, $f_5$, $f_1$, $f_4$, $f_6$, $f_2$, to effect production of the composite pulses occurring at times $t_{12}$ and $t_{14}$. Thus the first two demodulated arrival pulses produced by each of the detection units 17, 15, 11, 14, 16, and 17 are not allowed to pass through the switches connected thereto and the information pulses transmitted at times $t_2$–$t_7$ are also lost. The loss of these first information pulses transmitted is easily compensated for, however, by transmitting meaningless information pulses for a time sufficient to allow one of the summers 46, 48, 50 to begin producing composite pulses having enhanced magnitudes greater than $V_N$. In the illustrated example meaningful information can be transmitted beginning at time $t_8$.

The gating pulses are utilized to control the switches 30–39, the accumulators 20–29 and a plurality of switches 80–89, to effect reconstruction of the information signal from the demodulated arrival pulses produced by the detection units 10–19. Each demodulated arrival pulse is representative of both the logic state represented by the arrival pulse from which it is derived and of the magnitude, and thus the energy content, of the arrival pulse. All multipath arrival pulses originating from a common information pulse are accumulated, and thus accurate reconstruction of the information signal is possible even if very weak arrival pulses are received from every path.

The manner in which the accumulation takes place is best understood by referring to FIGS. 2E, 2F, 2I and 2J, which illustrate the utilization of the arrival pulses originating from the information pulses transmitted at times $t_8$ and $t_9$ to reconstruct those information pulses. The first two $P_{G8}$ gating pulses, illustrated in FIG. 2E, close switch 38 during time intervals $t_{12}$ and $t_{14}$. This causes the demodulated arrival pulses produced by detection unit 18 during these intervals (representing the $f_8$ arrival pulses received at $t_{12}$ and $t_{14}$) to be applied to accumulator 28. The zero designation in the first and second arrival pulses received at frequency $f_8$ in FIG. 2B indicates that these arrival pulses are received at frequency $f_8^-$ representing logical zero data, and thus demodulated arrival pulses of negative polarity are produced therefrom by detection unit 18.

Similarly, the first two $P_{G3}$ gating pulses, illustrated in FIG. 2I, close switch 33 during time intervals $t_{13}$ and $t_{15}$. This causes the demodulated arrival pulses produced by detection unit 13 during these intervals (representing the $f_3$ arrival pulses received at $t_{13}$ and $t_{15}$) to be applied to accumulator 23. The zero designation in the arrival pulses received at frequency $f_3$ during these time intervals indicates that these arrival pulses are received at frequency $f_3^-$ representing logical zero data, and thus demodulated arrival pulses of negative polarity are produced therefrom by detection unit 13.

The accumulators are not illustrated in detail, but in one form thereof they each comprise a capacitor and a conventional current source. The current source charges the capacitor with a current having a magnitude and polarity which is representative of the demodulated arrival pulses applied to the accumulator. Thus the two negative polarity demodulated arrival pulses applied to accumulator 28 during time intervals $t_{12}$ and $t_{14}$ cause the capacitor therein to charge negatively during their application, to produce a voltage $V_8$ illustrated in FIG. 2F. Similarly, the two negative polarity demodulated arrival pulses applied to accumulator 23 during time intervals $t_{13}$ and $t_{15}$ cause the capacitor therein to charge negatively during their application, to produce a voltage $V_3$ illustrated in FIG. 2J. The voltages produced by accumulators 27, 25, 21, 24, 26 and 22 are not illustrated, but are developed in the above-described manner from the detected arrival pulses received thereby.

The voltage produced by each accumulator is sampled after a predetermined time interval has elapsed. The duration of this time interval is determined by utilizing knowledge of the greatest time spread normally encountered for arrival pulses originating from a common information pulse, in the medium through which the information is communicated. For example, assume that in a particular medium the greatest time difference normally encountered from the detection of the first arrival pulse originating from an information pulse to the detection of the last arrival pulse originating from the same information pulse is less than one-half of the frame time period (T/2). Under these conditions, each accumulator can be sampled T/2 after the leading edge of the gating pulse occurring simultaneously with the first arrival pulse originating from each information pulse.

Sampling of the accumulations is controlled by sampling pulses designated $P_{S0}$-$P_{S9}$ which are produced by dual one-shots designated 90-99, respectively. These one-shots each include two conventional monostable multivibrators. Each one-shot has an input connected to receive the gating pulses applied to a respective one of the switches 30-39 and it produces two pulses at predetermined times after each gating pulse is received thereby.

After a one-shot is triggered by a gating pulse, its input is insensitive to subsequently received gating pulses and the one-shot cannot be retriggered until after it produces the two pulses. The first pulse is the sampling pulse which is produced T/2 after the dual one-shot is triggered by the leading edge of the gating pulse occurring simultaneously with the first arrival of each transmitted information pulse. The second pulse is a clear pulse which is utilized to effect resetting of the accumulator voltage to zero after it has been sampled. Clear pulses produced by the dual one-shots 90-99 are designated $P_{C0}$-$P_{C9}$, respectively.

By referring to FIGS. 2E-2M, the part that the sampling pulses and the clear pulses play in the reconstruction of the information signal can be understood. The sampling pulse $P_{S8}$, produced T/2 after the gating pulse $P_{G8}$ occurring at time interval $t_{12}$, closes switch 88 during time interval $t_{16}$. Consequently a sample of the voltage $V_8$ is produced at an output terminal 100, to which all of the switches 80-89 are connected. This sample which has the same magnitude and negative polarity as $V_8$ at time $t_{16}$, forms part of a voltage $V_{OUT}$ provided at terminal 100. This voltage is illustrated in FIG. 2M. Clear pulses $P_{C8}$ resets the accumulator voltage $V_8$ to zero after sampling thereof is completed.

Similarly, sampling pulse $P_{S3}$, produced T/2 after the gating pulse $P_{G3}$ occurring at time interval $T_{13}$, closes switch 83 during time interval $t_{17}$ and a sample of the voltage $V_3$ is produced at output terminal 100. This sample has the same magnitude and negative polarity as $V_3$ at time $t_{17}$ and is also illustrated in FIG. 2M. Clear pulse $P_{C3}$ resets the accumulator voltage $V_3$ to zero after sampling thereof if completed.

The above described accumulating, sampling and clearing processes are performed for the arrival pulses detected by each detection unit selected by frequency select unit 74, resulting in the reconstruction of the entire information signal transmitted after time $t_7$. This reconstructed signal is illustrated in FIG. 2M, with the time designations in the figure indicating the times at which the reproduced information pulses were transmitted. These processes are dynamic with respect to changes in the multipath pattern because the gating, sampling and clear pulses are generated synchronously with this pattern as defined by the enhanced composite pulses produced by the recursive filter selected by the comparator 58. The processes are also dynamic with respect to changes in the relative velocity of the transmitter and receiver, because the recursive filter selected is a function of the existing doppler shift.

Second Embodiment

Figure 9:
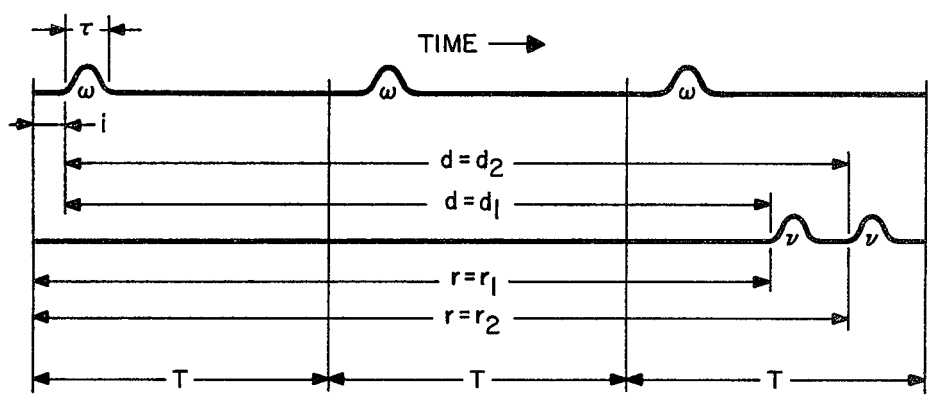
FIG. 9 is a waveform diagram of typical transmitted and received pulses.

In the second embodiment, arrival pulses, originating from information pulses transmitted at a known sequence of frequencies, are also processed to determine existing doppler shifts and multipath delays. The manner in which this is accomplished by the second embodiment can best be understood by initially considering the transmission of a single information pulse of duration $\tau$ and frequency $\omega$ in each time frame of period T, as is illustrated in FIG. 9. At thereceiver, a multiplicity of arrival pulses of frequency $\nu$ will be received from each information pulse transmitted, if there is multipath propagation. In the example illustrated in FIG. 9, two paths of propagation with delays $d=d_1$, $d_2$ exist.

At the receiver, the doppler shift can be unambiguously determined because both the transmitted and received frequencies ($\omega$, $\nu$) are known. The multipath delays $d=d_1$, $d_2$ can be determined (modulo T) if the period T is made sufficiently long to prevent the last arrival pulse originating from one information pulse from being overtaken by the first arrival pulse originating from the next information pulse. In the example of FIG. 9 this requirement is met if T is longer than $d_2-d_1$.

Although the actual propagation delays cannot be measured at the receiver, these delays can be measured relative to the beginning of each receiver time frame of period T. If the transmitting and receiving time frames happen to be synchronized, pulses travelling over paths having propagation delays that are exact multiples of the time frame period T will arrive at the receiver with an apparent delay of zero. Also, pulses travelling over paths having propagation delays that are non-exact multiples of T will arrive at the receiver with apparent delays each equal to a fraction of the period T. (Such synchronization does not generally occur, but will be assumed to exist, for the present, to simplify the explanation.)

Again referring to FIG. 9 it can be seen that if an information pulse is transmitted after a transmission delay i relative to the beginning of the time frame in which it is transmitted, then the delay r at which the arrival pulse originating therefrom will be received (relative to the beginning of the time frame in which it is transmitted) can be determined from the equation:

$$r = i + d \qquad (1)$$

The delay r, relative to the beginning of the time frame in which the arrival pulse is received, can be determined by expressing the result of equation (1) modulus T (which is the actual propagation time minus all whole multiples of T by which the actual propagation time is divisible).

If a period T of known duration is established, equation 1 can be utilized to construct a table in which can be found the transmission delay i of an arrival pulse received at any possible combination of relative propagation delay r and the actual propagation delay d. Table 1, below, gives these delays normalized to the value $\tau$ for an exemplary time frame having a period $T = 8\tau$.

TABLE 1

| r (modulo T) | TRANSMISSION DELAY (i) d | | | | | | | |
|---|---|---|---|---|---|---|---|---|
| | 0 | 1 | 2 | 3 | 4 | 5 | 6 | 7 |
| 0 | 0 | 7 | 6 | 5 | 4 | 3 | 2 | 1 |
| 1 | 1 | 0 | 7 | 6 | 5 | 4 | 3 | 2 |
| 2 | 2 | 1 | 0 | 7 | 6 | 5 | 4 | 3 |
| 3 | 3 | 2 | 1 | 0 | 7 | 6 | 5 | 4 |
| 4 | 4 | 3 | 2 | 1 | 0 | 7 | 6 | 5 |
| 5 | 5 | 4 | 3 | 2 | 1 | 0 | 7 | 6 |
| 6 | 6 | 5 | 4 | 3 | 2 | 1 | 0 | 7 |
| 7 | 7 | 6 | 5 | 4 | 3 | 2 | 1 | 0 |

If a known sequence of frequencies is transmitted during each period T, each transmitted frequency can be expressed as a function of the delay i at which it is transmitted. Table 2, below, tabulates this relationship for the eight frequency sequence utilized in the first embodiment. In the table the delays i are normalized to the value $\tau$ and $\omega(i)$ is used to indicate the functional dependence of each transmitted frequency on the transmission delay.

TABLE 2

| SEQUENCE OF TRANSMITTED FREQUENCIES | |
|---|---|
| i | $\omega(i)$ |
| 0 | $f_3$ |
| 1 | $f_7$ |
| 2 | $f_5$ |
| 3 | $f_1$ |
| 4 | $f_4$ |
| 5 | $f_6$ |
| 6 | $f_2$ |
| 7 | $f_8$ |

The frequency $\nu$ at which a transmitted pulse of frequency $\omega(i)$ is received can be expressed by the equation:

$$\nu = \omega(i) + s \qquad (2)$$

where s is the doppler shift. Equation 2 and table 2 can be utilized to determine the frequency $\nu$ at which an arrival pulse will be received as a result of a specific doppler shift of the frequency of the pulse transmitted at any delay i. The received frequencies for doppler shifts of $s = -\Delta f$, 0, $+\Delta f$ (occurring at the relative velocities $-v_1$, 0, $+v_1$, respectively) are tabulated in table 3, below. In the table the magnitude of s has been normalized to $\Delta f$, which also corresponds to the uniform spacing in the frequency spectrum between the transmitted frequencies $\omega(i)$.

TABLE 3.

| | RECEIVED FREQUENCY ($\nu$) | | |
|---|---|---|---|
| | | s | |
| i | −1 | 0 | +1 |
| 0 | $f_2$ | $f_3$ | $f_4$ |
| 1 | $f_6$ | $f_7$ | $f_8$ |
| 2 | $f_4$ | $f_5$ | $f_6$ |

TABLE 3.-continued

| | RECEIVED FREQUENCY ($\nu$) | | |
|---|---|---|---|
| | | s | |
| i | −1 | 0 | +1 |
| 3 | $f_0$ | $f_1$ | $f_2$ |
| 4 | $f_3$ | $f_4$ | $f_5$ |
| 5 | $f_5$ | $f_6$ | $f_7$ |
| 6 | $f_1$ | $f_2$ | $f_3$ |
| 7 | $f_7$ | $f_8$ | $f_9$ |

If the doppler shift and propagation delay(s) are known, tables 1-3 can be utilized to determine precisely when each arrival of a transmitted pulse will be received and at what frequency it will be received. By utilizing the knowledge thus determined, arrival pulses originating from each transmitted information pulse can be accumulated, as in the first embodiment, and the information signal can be reconstructed.

Although the doppler shift and propagation delay(s) of transmitted information pulses are not usually known, the existence of any combination of doppler shift/propagation delay can be tested for. Such a test can be conducted by assuming the existence of the combination and utilizing tables 1-3 to identify the frequency at which an arrival pulse should be received during each time frame interval. If, during each of these intervals, an arrival pulse is received at the frequency identified, the existence of the assumed combination of doppler shift and propagation delay is verified. This principle can be put to practical use by simultaneously testing for a multiplicity of doppler shift/propagation delay combinations spanning the ranges of such shifts and delays normally encountered during transmission.

An example is now given of the manner in which the tests are utilized to verify the existence of a doppler shift $s = 0$ and of propagation delays $d_1 = 19\tau$ and $d_2 = 21\tau$. Expressing these signal propagation conditions in the normalized forms given in the tables:

$s = 0$
$d_1 = 19\tau = 3\tau$ (modulo T) = 3 (normalized)
$d_2 = 21\tau = 5\tau$ (modulo T) = 5 (normalized)

Table 1 lists, for each of the propagation delays $d = 0$, 1 ... 7, the transmission delays i of the pulses received at relative delays $r = 0$, 1 ... 7, which represent the eight time intervals in each time frame. This information has been retabulated in table 4 below for the propagation delays $d = 3, 5$.

TABLE 4.

| | TRANSMISSION DELAY (i) r | | | | | | | |
|---|---|---|---|---|---|---|---|---|
| d | 0 | 1 | 2 | 3 | 4 | 5 | 6 | 7 |
| 3 | 5 | 6 | 7 | 0 | 1 | 2 | 3 | 4 |
| 5 | 3 | 4 | 5 | 6 | 7 | 0 | 1 | 2 |

Table 3 lists, for each of the doppler shifts $s = -1$, 0, $+1$, the frequencies to which the pulses transmitted at the delays $i = 0$, 1 ... 7 are shifted. By referring to the $s = 0$ column of table 3, the transmission delays listed in table 4 can be converted to the frequencies $\nu$ which will be received during the eight intervals ($r = 0, 1, \ldots 7$) of each time frame. These frequencies are listed in table 5 below.

TABLE 5.

| | RECEIVED FREQUENCIES $v$ (s = 0) | | | | | | | |
|---|---|---|---|---|---|---|---|---|
| | | | | r | | | | |
| d | 0 | 1 | 2 | 3 | 4 | 5 | 6 | 7 |
| 3 | $f_6$ | $f_2$ | $f_8$ | $f_3$ | $f_7$ | $f_5$ | $f_1$ | $f_4$ |
| 5 | $f_1$ | $f_4$ | $f_6$ | $f_2$ | $f_8$ | $f_3$ | $f_7$ | $f_5$ |

Table 5 lists the sequences of frequencies which will be received during each time frame if the doppler shift/propagation delay combinations 0/3 and 0/5 exist. Verifying the existence of these two combinations is accomplished by verifying the reception of the two frequency sequences. Thus, existence of the combination 0/3 is verified if a series of arrival pulses, having the frequency sequence $f_6$, $f_2$, $f_8$, $f_3$, $f_7$, $f_5$, $f_1$, $f_4$ is received during each successive time frame. Similarly, existence of the combination 0/5 is verified if a series of arrival pulses having the frequency sequence $f_1$, $f_4$, $f_6$, $f_2$, $f_8$, $f_3$, $f_7$, $f_5$ is received during each successive time frame.

It is important to note that for each of the discrete doppler shift/propagation delay combinations that can be formed with the chosen values s = −1, 0, +1 and d = 0, 1 . . . 7, a unique sequence of arrival pulse frequencies will be received. This can be proven by expanding table 5 to include all such combinations. Such an expanded table (table 6) is provided below.

TABLE 6.

| | RECEIVED FREQUENCIES $v$ | | | | | | | |
|---|---|---|---|---|---|---|---|---|
| | | | | r | | | | |
| s/d | 0 | 1 | 2 | 3 | 4 | 5 | 6 | 7 |
| −1/0 | $f_2$ | $f_6$ | $f_4$ | $f_0$ | $f_3$ | $f_5$ | $f_1$ | $f_7$ |
| −1/1 | $f_7$ | $f_2$ | $f_6$ | $f_4$ | $f_0$ | $f_3$ | $f_5$ | $f_1$ |
| −1/2 | $f_1$ | $f_7$ | $f_2$ | $f_6$ | $f_4$ | $f_0$ | $f_3$ | $f_5$ |
| −1/3 | $f_5$ | $f_1$ | $f_7$ | $f_2$ | $f_6$ | $f_4$ | $f_0$ | $f_3$ |
| −1/4 | $f_3$ | $f_5$ | $f_1$ | $f_7$ | $f_2$ | $f_6$ | $f_4$ | $f_0$ |
| −1/5 | $f_0$ | $f_3$ | $f_5$ | $f_1$ | $f_7$ | $f_2$ | $f_6$ | $f_4$ |
| −1/6 | $f_4$ | $f_0$ | $f_3$ | $f_5$ | $f_1$ | $f_7$ | $f_2$ | $f_6$ |
| −1/7 | $f_6$ | $f_4$ | $f_0$ | $f_3$ | $f_5$ | $f_1$ | $f_7$ | $f_2$ |
| 0/0 | $f_3$ | $f_7$ | $f_5$ | $f_1$ | $f_4$ | $f_6$ | $f_2$ | $f_8$ |
| 0/1 | $f_8$ | $f_3$ | $f_7$ | $f_5$ | $f_1$ | $f_4$ | $f_6$ | $f_2$ |
| 0/2 | $f_2$ | $f_8$ | $f_3$ | $f_7$ | $f_5$ | $f_1$ | $f_4$ | $f_6$ |
| 0/3 | $f_6$ | $f_2$ | $f_8$ | $f_3$ | $f_7$ | $f_5$ | $f_1$ | $f_4$ |
| 0/4 | $f_4$ | $f_6$ | $f_2$ | $f_8$ | $f_3$ | $f_7$ | $f_5$ | $f_1$ |
| 0/5 | $f_1$ | $f_4$ | $f_6$ | $f_2$ | $f_8$ | $f_3$ | $f_7$ | $f_5$ |
| 0/6 | $f_5$ | $f_1$ | $f_4$ | $f_6$ | $f_2$ | $f_8$ | $f_3$ | $f_7$ |
| 0/7 | $f_7$ | $f_5$ | $f_1$ | $f_4$ | $f_6$ | $f_2$ | $f_8$ | $f_3$ |
| +1/0 | $f_4$ | $f_8$ | $f_6$ | $f_2$ | $f_5$ | $f_7$ | $f_3$ | $f_9$ |
| +1/1 | $f_9$ | $f_4$ | $f_8$ | $f_6$ | $f_2$ | $f_5$ | $f_7$ | $f_3$ |
| +1/2 | $f_3$ | $f_9$ | $f_4$ | $f_8$ | $f_6$ | $f_2$ | $f_5$ | $f_7$ |
| +1/3 | $f_7$ | $f_3$ | $f_9$ | $f_4$ | $f_8$ | $f_6$ | $f_2$ | $f_5$ |
| +1/4 | $f_5$ | $f_7$ | $f_3$ | $f_9$ | $f_4$ | $f_8$ | $f_6$ | $f_2$ |
| +1/5 | $f_2$ | $f_5$ | $f_7$ | $f_3$ | $f_9$ | $f_4$ | $f_8$ | $f_6$ |
| +1/6 | $f_6$ | $f_2$ | $f_5$ | $f_7$ | $f_3$ | $f_9$ | $f_4$ | $f_8$ |
| +1/7 | $f_8$ | $f_6$ | $f_2$ | $f_5$ | $f_7$ | $f_3$ | $f_9$ | $f_4$ |

Figure 10:
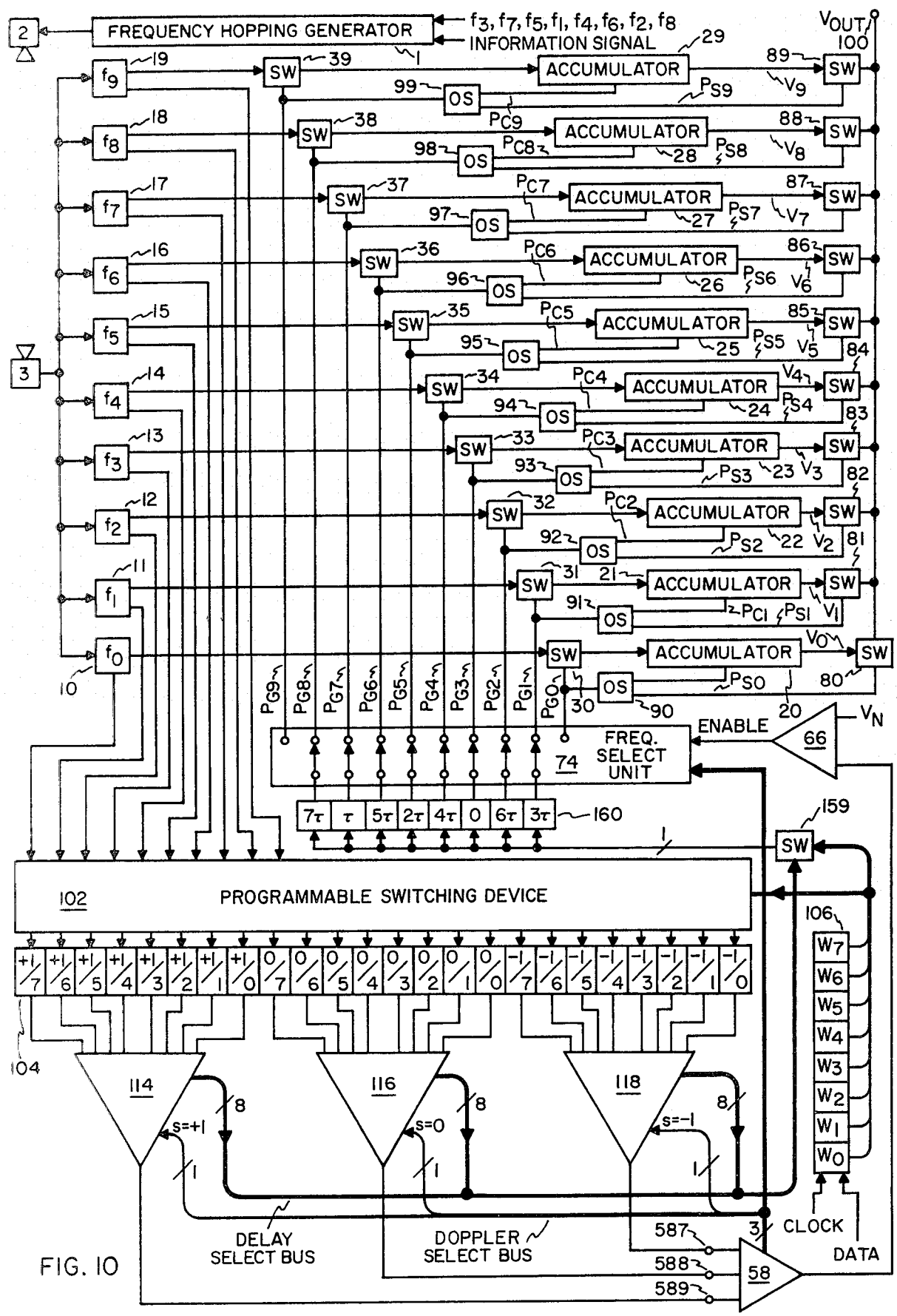
FIG. 10 is a schematic diagram of a second embodiment of the invention.

By testing for all of the frequency sequences listed in table 6, any doppler shift/propagation delay existing in the medium through which the pulses are transmitted can be unambiguously determined. One form of circuitry which can perform such testing and utilize the results obtained therefrom to reconstruct a transmitted information signal is illustrated in FIG. 10. The portion of the circuitry utilized to reconstruct the information signal is identical to that used in the first embodiment for the same purpose and it will not again be described in detail. It comprises the detection units 10-19, the accumulators 20-29, the switches 30-39, 80-89, the one-shots 90-99, the comparators 58, 66 and the frequency select unit 74.

For purposes of comparison, the exemplary information pulses and arrival pulses utilized to explain the first embodiment will also be used to explain the second embodiment. These pulses are illustrated in FIGS. 11A and 11B, respectively, for the time intervals $t_1$-$t_{23}$.

Note that the transmitter time frames ($T_X$) and the receiver time frames ($T_R$) are not synchronized with each other as was assumed during the formulation of equation 1. Such synchronism will rarely occur because the transmitter and receiver independently establish their own time frames. In the transmitter each time frame $T_X$ begins with the transmission of $f_3$, the first frequency in the sequence. In the receiver each time frame $T_R$ begins with the production of a data pulse which is periodically produced at the rate 1/T as is illustrated in FIG. 11C. Despite this lack of synchronism, however, both equation 1 and the tables produced therefrom can be used, without correction, to determine the sequence of frequencies which will be received in correspondence to the existence of each doppler shift/propagation delay combination. This can be shown by rewriting equation 1 to compensate for an arbitrary time difference Δt between the beginnings of the transmitter and receiver time frames. If this is done the relative propagation delay r becomes r+Δt, the actual propagation delay d becomes d+Δt, and the transmission delay i remains unchanged. Equation 1 then takes the form:

$$(r+\Delta t) = i + (d + \Delta t) \quad (3)$$

which reduces to the original equation 1.

The sequences of arrival pulses corresponding to respective doppler shift/propagation delay combinations are tested for by a programmable switching device 102 and a multiplicity of storate elements 104, illustrated in FIG. 10. The switching device 102 includes a plurality of inputs, each connected to a respective one of the detection units 10-19 to receive the arrival pulses detected at a different one of the frequencies $f_0$-$f_9$. The switching device also includes a plurality of outputs connected to respective storage elements 104, each of which is provided to test for a different one of the possible doppler shift/propagation delay combinations.

Figure 12:
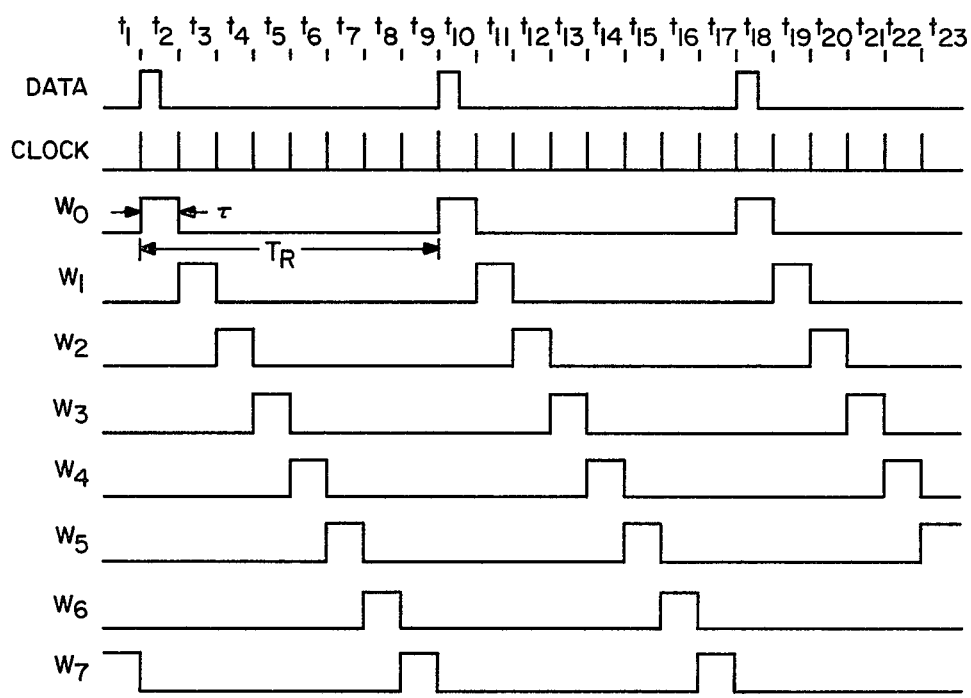
FIG. 12 is a waveform diagram of timing signals produced during operation of the second embodiment.

Timing control of the switching device is provided by a series of frame interval pulses $W_0$-$W_7$ produced by a shift register 106, in response to data pulses and clock pulses applied thereto in accordance with the timing relationships shown in FIG. 12. Although specific circuitry for producing the data and clock pulses is not herein disclosed, typical circuitry for producing these pulses would include an oscillator for producing the clock pulses at the rate of 1/τ and applying them to a divide-by-eight counter for producing the data pulses at the rate 1/T. Each successive data pulse applied to the shift register marks the beginning of a successive receiver time frame $T_R$. Each data pulse is shifted through the register by the clock pulses, causing the successive production of the frame interval pulses $W_0$-$W_7$ at respective outputs of the shift register. Each of the pulses $W_0$-$W_7$ is coexistent with a respective one of the eight time intervals in each receiver time frame.

Figure 13:
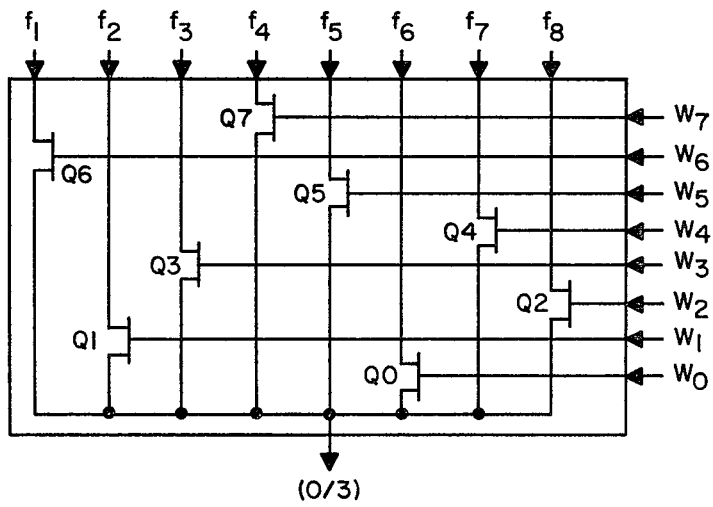
FIG. 13 is a detailed schematic diagram of a part of a programmable switching device illustrated generally in FIG. 10.

Internally, the switching device 102 comprises a plurality of programmable switch elements, each connected between selected ones of the device inputs and a single device output. During the successive time intervals of each time frame, each of these switch elements sequentially connects to its output the frequency inputs at which detected arrival pulses will be received if the doppler shift/propagation delay combination tested for by the storage element connected to its output actually exists. One form of programmable switch element which may be used is illustrated in FIG. 13 as comprising a plurality of FET switches Q0-Q7, each connected between a selected one of the detected frequency inputs and the single output of the switch element. Gating of the switches Q0-Q7 is controlled by the frame interval pulses $W_0$-$W_7$, respectively.

The particular switch element shown in FIG. 13 is utilized in conjunction with the storage element designated 0/3 to test for zero doppler shift and a propagation delay of 3. The FET switches are connected to receive the detected frequencies $f_1$-$f_8$ because at the doppler shift s=0 the transmitted frequencies are unchanged. The switches Q0, Q1.... Q7 are connected to detected frequency inputs $f_6$, $f_2$, $f_8$, $f_3$, $f_7$, $f_5$, $f_1$, $f_4$, respectively, because at the propagation delay d=3 the arrival pulses are received in this frequency sequence.

Figure 14:
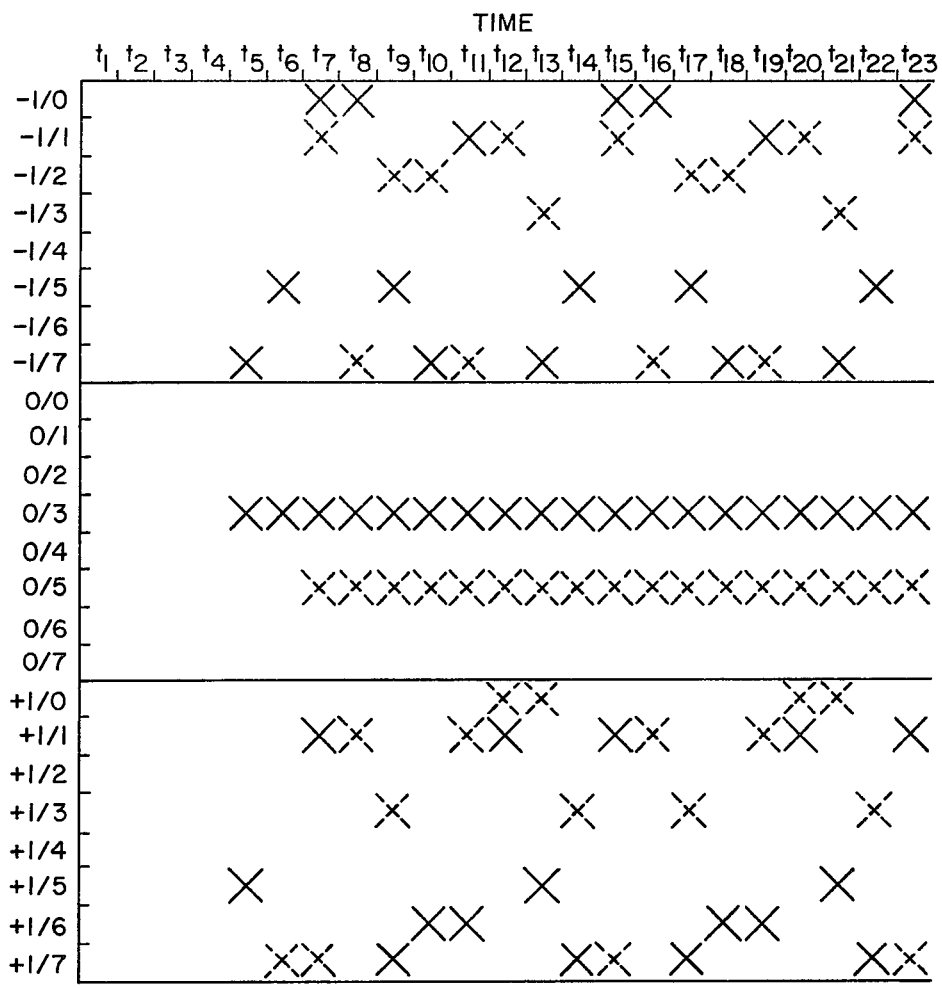
FIG. 14 is a diagram illustrating the times at which signals are received by recursive filters illustrated in FIG. 10.

FIG. 14 shows the times at which detected arrival pulses are received by the individual storage elements 104 as a result of the reception of the arrival pulses illustrated in FIG. 11B. The solid-line X's represent the first arrivals of the transmitted information pulses, shown in solid lines in FIG. 11B. The dashed-line X's represent the second arrivals of the information pulses, shown in dashed lines in FIG. 11B. Note that the only storage elements consistently receiving arrival pulses are those utilized to test for the doppler shift/propagation delay combinations 0/3 and 0/5. These are the doppler shift and propagation delays actually existing when the arrival pulses illustrated in FIG. 11B are received.

Figure 15:
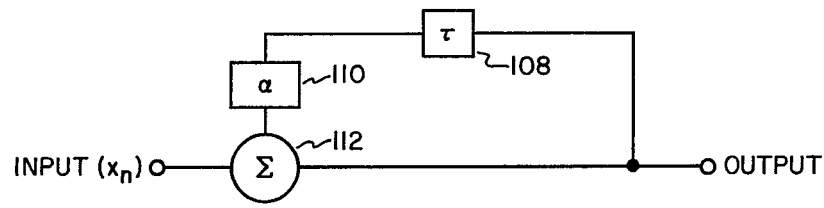
FIG. 15 is a detailed schematic diagram of a recursive filter illustrated generally in FIG. 10.

In order to determine the repetitiveness with which the individual storage elements receive arrival pulses, each storage element forms a time-weighted average of the amplitudes of the pulses passed thereto by the switching device. One circuit which may be used to implement each of the storage elements is a recursive filter such as that illustrated in FIG. 15. In this form each storage element comprises an input for receiving arrival pulses from the detection units to which it is sequentially connected by the switching device, a delay unit 108, an attenuator 110, an analog summer 112 and an output. During each time interval $t_n$, summer 112 produces an analog sum $S_n$ having a magnitude defined by the equation:

$$S_n = x_n + \alpha S_{n-1}$$

where:
$x_n$ = the amplitude of the detected arrival pulse applied to the input during time interval $t_n$.
$\alpha$ = attenuation factor
$S_{n-1}$ = magnitude of the sum produced by summer 112 during the time interval $t_{n-1}$.

The recursive filter operates similarly to the recursive filter utilized in the first embodiment, but only one sum is stored in the delay unit. This stored sum is a time-weighted average of the amplitudes of the detected arrival pulses applied to the recursive filter during all prior testing intervals. It is provided at the output of the recursive filter as a test signal. The recursive filters testing for the doppler shift/propagation delay combinations actually existing will produce test signals of greater magnitude than the other recursive filters because the sums which the test signals represent will be repetitively reinforced and continue to increase, while the sums produced by all the other recursive filters will increase only intermittently and will decrease toward zero during a time frame interval when no detected arrival pulses are applied thereto.

The test signals produced by the recursive filters testing for the doppler shift/propagation delay combinations −1/7, 0/3 and 0/5 are illustrated in FIGS. 11D, 11E and 11F, respectively. The test signal for the non-existing combination −1/7 was arbitrarily chosen for comparison with the existing combinations 0/3 and 0/5. A voltage level $V_T$ illustrated in FIGS. 11D, 11E and 11F is a threshold level having a magnitude representative of the minimum test signal magnitude that would normally be produced as a result of testing for arrival pulses propagating over an actually existing path.

The eight recursive filters for each of the three doppler shifts (+1, 0, −1) are connected to respective inputs of one of three identical comparators 114, 116, 118. Each of these comparators continuously compares the magnitudes of the test signals applied thereto by the recursive filters and passes the greatest magnitude test signal applied to a respective one of three terminals 587, 588, 589 at the input of comparator 58.

Figure 16:
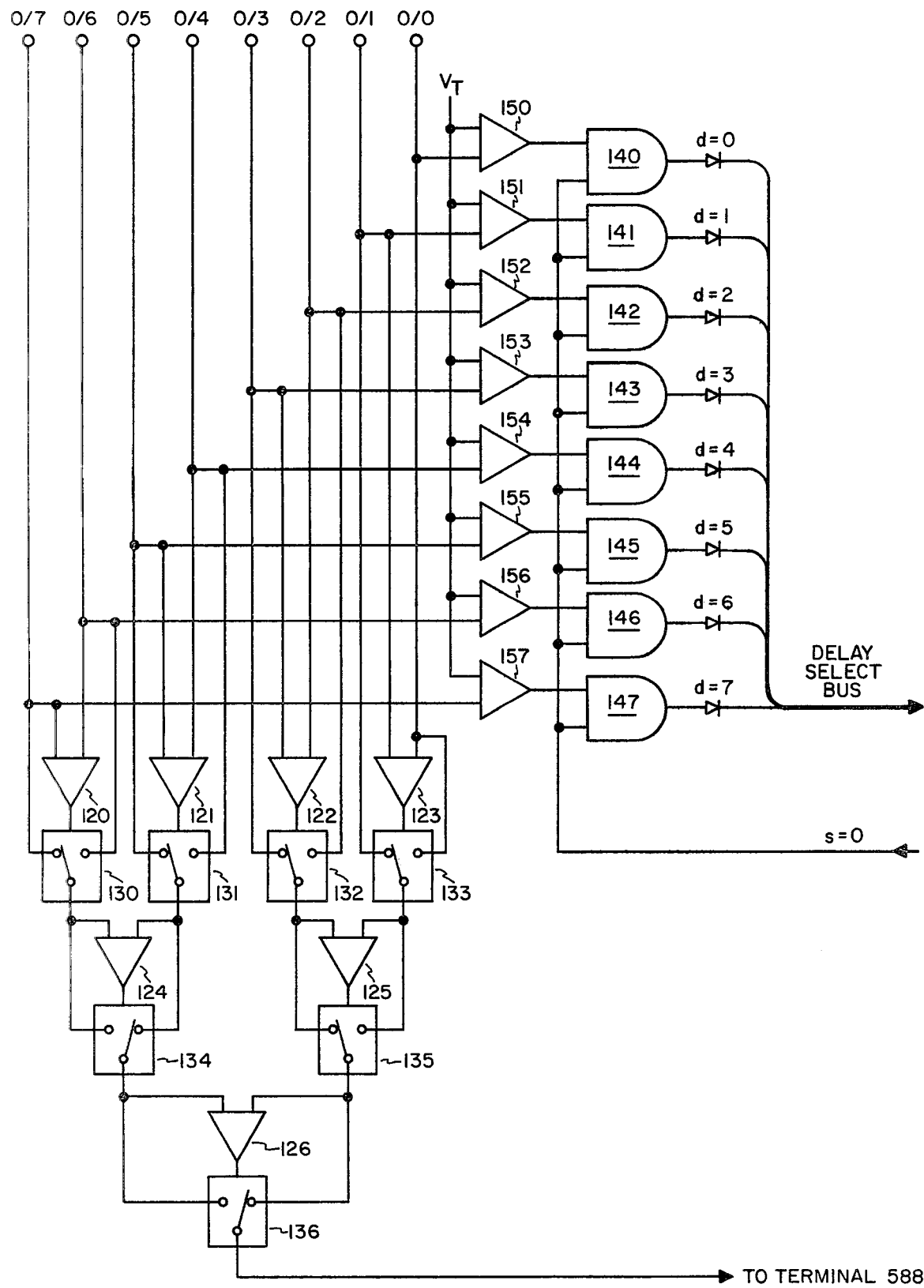
FIG. 16 is a detailed schematic diagram of a comparator illustrated generally in FIG. 10.

Comparator 116, which receives the zero-doppler test signals, is illustrated in detail in FIG. 16 as including a plurality of dual input operational amplifiers 120-126 and dual input analog switches 130-136 connected to operate in the same manner as those in comparator 58. Amplifiers 120, 121, 122, 123 each receive two of the eight test signals 0/7, 0/6, 0/5, 0/4, 0/3, 0/2, 0/1, 0/0 at their respective inputs and control respective switches 130, 131, 132, 133 to effect passage of the greater magnitude signal received thereby to a respective input of one of the amplifiers 124, 125. Each of these amplifiers controls a respective one of the switches 134, 135 to effect passage of the greater magnitude signal applied thereto to a respective input of amplifier 126. This amplifier controls switch 136 to effect passage of the greater magnitude signal applied thereto to terminal 588.

For the exemplary arrival pulses of FIG. 11B, received at the doppler shift s=0 and at propagation delays d=3,5, the test signals applied to comparator 116 by storage elements 0/3 and 0/5 will have the greatest magnitudes and the analog switches in comparator 116 will take the positions illustrated in FIG. 16. The test signal 0/5 will be passed through switches 181 and 134 to one input of amplifier 126 and the test signal 0/3 will be passed through switches 132 and 135 to the other input of the amplifier. Amplifier 126 then causes the larger of these test signals to be passed through switch 136 to terminal 588. It can be seen from FIGS. 11D and 11E that the test signals 0/3 and 0/5 are of approximately equal magnitude, but for the purpose of this example it will be assumed that the magnitude of test signal 0/3 is slightly greater than that of 0/5.

In a similar manner, each of the comparators 114 and 118 passes to a respective one of the terminals 589 and 587 the greatest magnitude test signal received by the comparator. The magnitudes of the test signals applied to the terminals 587, 588, 589 represent the repetitiveness with which the storage elements testing for the doppler shifts −1, 0, +1 receive arrival pulses.

Comparator 58, which is illustrated in detail in FIG. 8, compares the three test signals applied to terminals 587, 588, 589 and applies the one of greatest magnitude to the comparator 66 for comparison with the voltage level $V_N$. The comparator 58 also utilizes the greatest magnitude test signal applied thereto to effect production of the doppler select signal corresponding to the existing doppler, as was previously described for the first embodiment. The doppler select signal produced is transmitted over the doppler select bus and applied to the frequency select unit 74 to effect selection of the set of frequencies which are received at the existing doppler. It is also transmitted over this bus to the comparator 114, 116 or 118 from which the test signal of greatest magnitude was received.

The three signal lines in the doppler select bus are utilized to carry the doppler select signals $s=+1$, $s=0$, $s=-1$ to the comparators 114, 116, 118, respectively. For the exemplary arrival pulses of FIG. 11B the test signal 0/3 applied to terminal 588 causes the logical ONE doppler select signal $s=0$ to be produced by AND-gate 585 in comparator 58 (see FIG. 8) and transmitted over the doppler select bus to comparator 116. Logical ZERO signals will be produced by AND-gate 584 and inverter 586 and transmitted over the doppler select bus to comparators 118 and 114, respectively.

As can be seen from the detailed illustration of comparator 116 in FIG. 16, the comparator includes a plurality of dual input AND-gates 140–147 each having one input connected to the signal line carrying the $s=0$ doppler select signal. The second input of each AND-gate is connected to the output of a respective one of comparators 150–157 which compare the test signals 0/0–0/7, respectively, with the voltage level $V_T$. The comparators, which are operational amplifiers connected for open loop operation, each produce a logical ONE output if the test signal applied thereto has a magnitude greater than $V_T$. In the present example, the test signals 0/3, 0/5 have such magnitudes as is illustrated in FIGS. 11E and 11F, respectively. No other test signals of such magnitude are applied to comparator 116 because no arrival pulses are received by the other storage elements connected thereto (0/0, 0/1, 0/2, 0/4, 0/6, 0/7) as can be seen from FIG. 14. Thus, the comparators 153 and 155 apply logical ONE signals to AND-gates 143 and 145, respectively. These logical ONE signals are passed through the AND-gates, which are enabled by the $s=0$ doppler select signal, and are then coupled through diodes to two of eight lines in a delay select bus, where they are transmitted as $d=3$ and $d=5$ delay select signals.

The eight AND-gates in the other two comparators 114, 118 are also connected to the eight lines in the delay select bus, but those gates are disabled by the logical ZERO signals transmitted thereto over the doppler select bus. Thus all of the AND-gates in comparators 114, 118 and the gates 140, 141, 142, 144, 146, 147 produce logical ZERO signals. A diode is connected between each AND-gate and the respective line in the delay select bus to isolate ZERO-producing AND-gates from the lines in the delay select bus on which logical ONE delay select signals are geing transmitted. Such delay select signals, which are more positive than the logical ZERO voltage level for the diode polarity shown, cause the diodes to be reverse biased.

Figure 17:
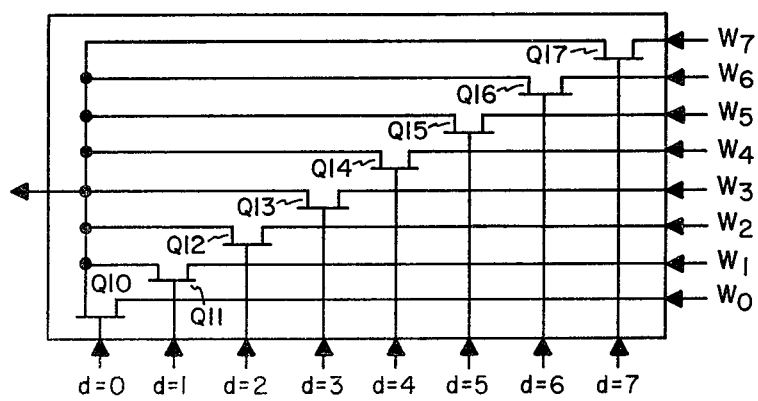
FIG. 17 is a detailed schematic diagram of a controlled switch illustrated generally in FIG. 10.

The delay select signals transmitted over the delay select bus are applied to a controlled switch 159. This switch, is illustraed in detail in FIG. 17 as comprising a plurality of FET switches Q10–Q17, each connected between a common output and a respective input at which one of the frame interval pulses $W_0$–$W_7$, produced during the eight time intervals ($r=0, 1, \ldots 7$) of each time frame $T_R$, is received. Gating of the switches Q10, Q11, ... Q17 is controlled by the delay select signals applied to inputs designated $d=0$, $d=1 \ldots d=7$, respectively. For each existing delay d, switch 159 is controlled by the corresponding delay select signal to pass the frame interval pulse produced during each receiver time frame interval when an arrival pulse originating from the information pulse transmitted during the first transmitter time frame interval ($i=0$) is received.

The frame interval pulses passed by controlled switch 159 during each time frame $T_R$ are applied to a delay unit 160 comprising eight delay elements which provide replicas of the pulses after delays of 0, $\tau$. . . $7\tau$. The zero-delayed replicas pass through the frequency select unit 74 from which they emerge as the gating pulses used to gate into the respective accumulator the arrival pulses originating from the information pulse transmitted at the delay $i=0$ in each time frame $T_X$. Similarly, the $\tau$, $2\tau$. . . $7\tau$ delayed replicas pass through the frequency select switch and emerge as the gating pulses used to gate into respective accumulators the arrival pulses originating from the information pulses transmitted at the delays $i=1, 2 \ldots 7\tau$ in each time frame $T_X$.

During reception of the arrival pulses illustrated in FIG. 11B, the $d=3$ and $d=5$ delay select signals produced by comparator 116 enable the FET switches Q13 and Q15 in switch 159 to pass the pulses $W_3$ and $W_5$ to the delay unit 160. With the switches in the frequency select unit 74 switched to the zero doppler positions by the $s=0$ doppler select signal, the replicas of these two pulses produced at the delays 0, $\tau$, $2\tau$, $3\tau$, $4\tau$, $5\tau$, $6\tau$, $7\tau$ pass through the frequency select unit and emerge as the gating pulses $P_{G3}$, $P_{G7}$, $P_{G5}$, $P_{G1}$, $P_{G4}$, $P_{G6}$, $P_{G2}$, $P_{G8}$, respectively. The gating pulses are produced in the same sequence as the arrival pulse frequencies are received ($f_3$, $f_7$, $f_5$, $f_1$, $f_4$, $f_6$, $f_2$, $f_8$) at the existing dopper ($s=0$) and are used to control accumulation of the demodulated arrival pulses as was explained for the first embodiment. The frame interval pulses $W_3$, $W_5$ and the gating pulses $P_{G3}$ and $P_{G7}$ produced therefrom are illustrated in FIGS. 11G, 11H and 11L, respectively.

For the purposes of simplifying the above description, each receiver time frame was divided into only eight sampling intervals, corresponding to the number of information pulses transmitted during each transmitter time frame. In practice the number of sampling intervals will generally be larger and thus the propagation delay d will be more precisely determined.

The gating pulses produced by the second embodiment are identical to those produced by the first embodiment, but even the first arrival pulses detected are accumulated because the gating pulses are produced simultaneously with the reception of the arrival pulses from which they are derived. This can be seen by referring to FIGS. 11G–11P where the signals produced during accumulation of the arrival pulses received at frequencies $f_3$ and $f_7$ to effect reproduction of the information transmitted during time intervals $t_1$, $t_2$, $t_9$, $t_{10}$ is illustrated.

From the above description it can be seen that methods and apparatus have been provided for accurately reproducing information transmitted through a medium in which propagated information-carrying energy is subject to multipath delay spread effects and doppler frequency-shift effects. The multiple arrivals of each transmitted information pulse are nonambiguously identified and accumulated such that even very weak arrival pulses contribute to the reproduction of the information. This makes effective communication possible even where all received arrival pulses have magnitudes only slightly greater than the existing noise level.

Although specific embodiments of the present invention have been disclosed, it is to be understood that they are only illustrative and the scope of the invention is to be determined from the claims. For example, the entire reproduction of the transmitted information can be effected by digital techniques if the received arrival pulses are converted to digital numbers representative thereof.

I claim:

1. In a system for communicating information from a transmitter to a receiver, through a medium in which transmitted energy representative of the information is subject to multipath delay spread effects and doppler frequency-shift effects, where the information is transmitted in the form of a series of modulated information pulses of differing nominal frequencies, the nominal frequencies of successive pulses being repeatedly shifted through a predetermined sequence of F frequencies repeated every transmitter time frame of period $T = F\tau$, where $\tau$ equals the duration of each information pulse and where the modulation represents the information, each of said information pulses being received in the form of a plurality of doppler-shifted arrival pulses which travelled different paths of propagation, an improved apparatus for reproducing the information at the receiver, said apparatus comprising:
(a) a plurality of detection units, each adapted to detect arrival pulses received at a distinct frequency, the range of frequencies detected being broad enough to include all shifted frequencies which will be received at predetermined doppler shifts occurring over an expected range of relative velocities of the transmitter and the receiver, each of said detection units being further adapted to produce, from each arrival pulse detected thereby, a demodulated arrival pulse simultaneous therewith, said demodulated arrival pulse having a polarity representing the information communicated by the arrival pulse and having a magnitude representing the magnitude of the arrival pulse;
(b) means for comparing the energy received at the distinct frequencies to determine the F doppler-shifted frequencies at which the arrival pulses are received and for producing a doppler select signal representative of the doppler shift;
(c) means for producing a pulse coexistent with the reception of each arrival pulse detected at a predetermined one of said doppler-shifted frequencies;
(d) a delay unit for receiving the coexistent pulses and producing F replicas of each pulse after delays of 0, $\tau$, $2\tau$, . . . $(F-1)\tau$, the replicas of each coexistent pulse being produced simultaneously with the reception of F arrival pulses detected at said F doppler-shifted frequencies;
(e) a plurality of accumulators each adapted to algebraically accumulate the magnitudes of the demodulated arrival pulses produced by a respective one of the detection units;
(f) a plurality of switches, each connected between one of the accumulators and its respective detection unit;
(g) a frequency select unit for receiving the doppler select signal and the F replicas of each coexistent pulse, said doppler select signal causing the F replicas to be applied as gating pulses to respective ones of the F switches connected to the detection units adapted to detect the doppler-shifted frequencies received, the specific switch to which each of the F gating pulses is applied being selected such that the switch closes each time a demodulated arrival pulse is produced by the detection unit connected thereto and passes said pulse to the connected accumulator;
(h) means for sampling the accumulation in each accumulator after the magnitudes of all demodulated arrival pulses representing the information communicated by a single information pulse have been accumulated thereby, the sequential samples thus formed representing the information transmitted; and
(i) means for resetting each accumulation to a predetermined magnitude after it has been sampled.

2. In a system for communicating information from a transmitter to a receiver, through a medium in which transmitted energy representative of the information is subject to multipath delay spread effects and doppler frequency-shift effects, where the information is transmitted in the form of a series of modulated information pulses of differing nominal frequencies, the nominal frequencies of successive pulses being repeatedly shifted through a predetermined sequence of F frequencies repeated every transmitter time frame of period $T = F\tau$, where $\tau$ equals the duration of each information pulse and where the modulation represents the information, each of said information pulses being received in the form of a plurality of doppler-shifted arrival pulses which travelled different paths of propagation, an improved apparatus for reproducing the information at the receiver, said apparatus comprising:
(a) a plurality of detection units, each adapted to detect arrival pulses received at a distinct frequency, the range of frequencies detected being broad enough to include all doppler shifted frequencies which will be received at predetermined doppler shifts occurring over an expected range of relative velocities of the transmitter and the receiver, each of said detection units being further adapted to produce, from each arrival pulse detected thereby, a demodulated arrival pulse simultaneous therewith, said demodulated arrival pulse having a polarity representing the information communicated by the arrival pulse and having a magnitude representing the magnitude of the arrival pulse;
(b) a plurality of delay units each utilized to test for the existence of one of the predetermined doppler shifts, each unit including F delay elements connected to respective ones of the detection units adapted to detect the doppler-shifted frequencies at which the arrival pulses will be received when one of the predetermined doppler shifts exists, each delay element delaying the detected arrival pulses produced by the detection unit connected thereto by the number of time intervals $\tau$ by which the corresponding transmitted frequency precedes a selected one of the transmitted frequencies in the sequence;
(c) a plurality of analog summers utilized in conjunction with the delay units to test for the existence of one of the predetermined doppler shifts, each summer being connected to a respective one of the delay units to continuously sum the magnitudes of the detected arrival pulses delayed thereby and to produce a series of composite pulses therefrom;

(d) comparator means for determining which analog summer is producing the composite pulses of greatest magnitude and for producing a doppler select signal representing the doppler shift tested for by the summer, said doppler select signal representing the existing doppler shift and said composite pulses representing the propagation delays at which each arrival pulse is received;

(e) switching means for receiving the composite pulses and the doppler select signal, and for passing to an output thereof the composite pulses produced by the summer testing for the doppler shift represented by said doppler select signal;

(f) a delay unit connected to the output of the switching means for receiving the composite pulses passed thereto and producing F replicas of each pulse after delays of $0, \tau, 2\tau, \ldots (F-1)\tau$, the replicas of each composite pulse passed being produced simultaneously with the reception of F arrival pulses detected at the F doppler-shifted frequencies received, and at the propagation delay represented by the composite pulse;

(g) a plurality of accumulators each adapted to algebraically accumulate the magnitudes of the demodulated arrival pulses produced by a respective one of the detection units;

(h) a plurality of switches, each connected between one of the accumulators and its respective detection unit;

(i) a frequency select unit for receiving the doppler select signal and the F replicas of each composite pulse passed, said doppler select signal causing the F replicas to be applied as gating pulses to respective ones of the F switches connected to the detection units adapted to detect the doppler-shifted frequencies received, the specific switch to which each of the F gating pulses is applied being selected such that the switch closes each time a demodulated arrival pulse is produced by the detection unit connected thereto and passes said pulse to the connected accumulator;

(j) means for sampling the accumulation in each accumulator after the magnitudes of all demodulated arrival pulses representing the information communicated by a single information pulse have been accumulated thereby, the sequential samples thus formed representing the information transmitted; and (k) means for resetting each accumulation to a predetermined magnitude after it is has been sampled.

3. In a system for communicating information from a transmitter to a receiver, through a medium in which transmitted energy representative of the information is subject to multipath delay spread effects and doppler frequency-shift effects, where the information is transmitted in the form of a series of modulated information pulses of differing nominal frequencies, the nominal frequencies of successive pulses being repeatedly shifted through a predetermined sequence of F frequencies repeated every transmitter time frame of period $T = F\tau$, where $\tau$ equals the duration of each information pulse and where the modulation represents the information, each of said information pulses being received in the form of a plurality of doppler-shifted arrival pulses which travelled different paths of propagation, an improved apparatus for reproducing the information at the receiver, said apparatus comprising:

(a) a plurality of detection units, each adapted to detect arrival pulses received at a distinct frequency, the range of frequencies detected being broad enough to include all doppler shifted frequencies which will be received at predetermined doppler shifts occurring over an expected range of relative velocities of the transmitter and the receiver, each of said detection units being further adapted to produce, from each arrival pulse detected thereby, a demodulated arrival pulse simultaneous therewith, said demodulated arrival pulse having a polarity representing the information communicated by the arrival pulse and having a magnitude representing the magnitude of the arrival pulse;

(b) means for producing a series of frame interval pulses during each successive receiver time frame of period T, said pulses being produced at predefined delays relative to the beginning of the time frame in which they are produced;

(c) a switching device having a plurality of inputs and outputs, each input being connected to a respective one of the detection units to receive arrival pulses detected at one of the distinct frequencies, each output being provided to enable testing for a different one of the possible doppler shift/propagation delay combinations that can be formed from said predetermined doppler shifts and the predefined delays at which the frame interval pulses are produced, the switching device performing said testing during each receiver time frame by connecting each output to the inputs at which detected arrival pulses will be received if the doppler shift tested for at the output exists, the inputs being connected to the output in the same sequence as detected arrival pulses will be received thereby if the propagation delay tested for at the output exists;

(d) a plurality of storage elements utilized in conjunction with the switching device to test for the possible doppler shift/propagation delay combinations, each storage element being connected to a respective one of the switching device outputs to receive the detected arrival pulses passed to said output by the switching device, each storage element producing a test signal having a magnitude representative of the repetitiveness with which detected arrival pulses are received thereby;

(e) comparator means connected to the storage elements for determining which test signal has the greatest magnitude and for producing a doppler select signal representing the doppler shift tested for by the storage element producing the test signal of greatest magnitude, said doppler select signal representing the existing doppler shift;

(f) comparator means connected to the storage elements to determine which of the test signals produced by the storage elements testing for the existing doppler shift and the possible propagation delays have magnitudes indicative of an existing propagation delay, and for each of such signals producing a delay select signal representing the existing delay;

(g) switching means for receiving the frame interval pulses and the delay select signals, and for passing to an output thereof the frame interval pulses corresponding to the existing delays represented by said delay select signals;

(h) a delay unit connected to the output of the switching means for receiving the frame interval pulses passed thereto and producing F replicas of each pulse after delays of 0, $\tau$, $2\tau$, . . . $(F-1)\tau$, the replicas of each frame interval pulse passed being produced simultaneously with the reception of F arrival pulses detected at the F doppler-shifted frequencies received, and at the propagation delay represented by the frame interval pulse;

(i) a plurality of accumulators each adapted to algebraically accumulate the magnitudes of the demodulated arrival pulses produced by a respective one of the detection units;

(j) a plurality of switches, each connected between one of the accumulators and its respective detection unit;

(k) a frequency select unit for receiving the doppler select signal and the F replicas of each frame interval pulse passed, said doppler select signal causing the F replicas to be applied as gating pulses to respective ones of the F switches connected to the detection units adapted to detect the doppler-shifted frequencies received, the specific switch to which each of the F gating pulses is applied being selected such that the switch closes each time a demodulated arrival pulse is produced by the detection unit connected thereto and passes said pulse to the connected accumulator;

(l) means for sampling the accumulation in each accumulator after the magnitudes of all demodulated arrival pulses representing the information communicated by a single information pulse have been accumulated thereby, the sequential samples thus formed representing the information transmitted; and (m) means for resetting each accumulation to a predetermined magnitude after it has been sampled.

* * * * *